(12) United States Patent
Sollami et al.

(10) Patent No.: US 12,443,420 B2
(45) Date of Patent: Oct. 14, 2025

(54) AUTOMATIC IMAGE CONVERSION

(71) Applicant: salesforce.com, inc., San Francisco, CA (US)

(72) Inventors: Michael Sollami, Cambridge, MA (US); Sönke Rohde, San Francisco, CA (US); Alan Martin Ross, San Francisco, CA (US); David James Woodward, Bozeman, MT (US); Jessica Lundin, Seattle, WA (US); Owen Winne Schoppe, Orinda, CA (US); Brian J. Lonsdorf, Soquel, CA (US); Aashish Jain, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/649,045

(22) Filed: Jan. 26, 2022

(65) Prior Publication Data

US 2023/0129240 A1   Apr. 27, 2023

Related U.S. Application Data

(60) Provisional application No. 63/271,968, filed on Oct. 26, 2021.

(51) Int. Cl.
*G06N 3/08* (2023.01)
*G06F 3/04845* (2022.01)
(Continued)

(52) U.S. Cl.
CPC .......... *G06F 9/451* (2018.02); *G06F 3/04845* (2013.01); *G06F 9/547* (2013.01);
(Continued)

(58) Field of Classification Search
CPC ............ G06F 9/451; G06F 9/547; G06F 8/38; G06F 3/04845; G06N 3/0454; G06N 3/08;
(Continued)

(56) References Cited

U.S. PATENT DOCUMENTS 8,271,837 B2   9/2012   Prophete et al.
8,407,184 B2   3/2013   Prophete et al.
(Continued)

FOREIGN PATENT DOCUMENTS

AU   2019236628 A1   4/2020
CA    3112952 A1     4/2020
(Continued)

OTHER PUBLICATIONS

Beltramelli, Tony. "pix2code: Generating code from a graphical user interface screenshot." In Proceedings of the ACM SIGCHI Symposium on Engineering Interactive Computing Systems, pp. 1-6. 2018. (Year: 2018).*

(Continued)

*Primary Examiner* — Kieu D Vu
*Assistant Examiner* — Blaine T Basom
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed for automatically converting a layout image to a text-based representation. In the disclosed techniques, a server computer system receives a layout image that includes a plurality of portions representing a plurality of user interface (UI) elements included in a UI design. The server computer system transforms, via executed of a trained residual neural network (ResNet), the layout image to a text-based representation of the layout image that specifies coordinates of bounding regions of the plurality of UI elements included in the UI design, where the (Continued)

text-based representation is usable to generate program code executable to render the UI design. The disclosed techniques may advantageously automate one or more portions of a UI design process and, as a result save time and computing resources via the execution of an image to text-based conversion ResNet machine learning model.

20 Claims, 13 Drawing Sheets

(51) Int. Cl.
  *G06F 8/38*  (2018.01)
  *G06F 9/451*  (2018.01)
  *G06F 9/54*  (2006.01)
  *G06N 3/044*  (2023.01)
  *G06N 3/045*  (2023.01)
  *G06V 10/762*  (2022.01)
  *G06V 10/771*  (2022.01)
  *G06V 10/82*  (2022.01)
  *G06N 3/047*  (2023.01)
  *G06N 3/088*  (2023.01)
  *G06N 7/01*  (2023.01)
  *G06V 30/19*  (2022.01)

(52) U.S. Cl.
  CPC .............. *G06N 3/045* (2023.01); *G06N 3/08* (2013.01); *G06V 10/763* (2022.01); *G06V 10/771* (2022.01); *G06V 10/82* (2022.01); *G06F 8/38* (2013.01); *G06N 3/044* (2023.01); *G06N 3/047* (2023.01); *G06N 3/088* (2013.01); *G06N 7/01* (2023.01); *G06V 30/19173* (2022.01)

(58) Field of Classification Search
  CPC ........ G06N 3/045; G06N 3/044; G06N 3/047; G06N 3/088; G06N 7/01; G06N 3/084; G06N 3/0455; G06N 3/0475; G06N 3/094; G06V 10/763; G06V 10/771; G06V 10/82; G06V 30/19173; G06V 10/774
  See application file for complete search history.

(56) References Cited

U.S. PATENT DOCUMENTS

| | | | |
|---|---|---|---|
| 9,100,240 | B2 | 8/2015 | Prophete et al. |
| 9,716,695 | B2 | 7/2017 | Mahajan et al. |
| D884,027 | S | 5/2020 | Day et al. |
| 10,706,113 | B2 | 7/2020 | Lundin et al. |
| 10,789,066 | B1 | 9/2020 | Rohde et al. |
| 10,796,285 | B2 | 10/2020 | Johnson et al. |
| 10,896,049 | B2 | 1/2021 | Rohde et al. |
| 10,928,982 | B2 | 2/2021 | Hou et al. |
| D913,319 | S | 3/2021 | Day et al. |
| 10,949,865 | B2 | 3/2021 | Rohde et al. |
| 10,963,694 | B2 | 3/2021 | Rohde et al. |
| D924,907 | S | 7/2021 | Day et al. |
| 11,074,044 | B1 | 7/2021 | Schoppe et al. |
| 11,119,793 | B2 | 9/2021 | Schoppe et al. |
| 11,182,135 | B2 | 11/2021 | Schoppe et al. |
| 11,210,111 | B2 | 12/2021 | Rohde et al. |
| 11,221,833 | B1* | 1/2022 | Huang .................. G06F 9/451 |
| 11,537,787 | B2* | 12/2022 | Shekhar ................ G06F 18/211 |
| 2018/0056130 | A1 | 3/2018 | Bitran et al. |
| 2018/0060500 | A1 | 3/2018 | Ni et al. |
| 2018/0089372 | A1 | 3/2018 | Bitran et al. |
| 2018/0101807 | A1 | 4/2018 | Ni et al. |
| 2018/0107793 | A1 | 4/2018 | Ni et al. |
| 2018/0107962 | A1 | 4/2018 | Lundin et al. |
| 2018/0342061 | A1* | 11/2018 | Xiang ..................... G06T 7/70 |
| 2019/0250891 | A1* | 8/2019 | Kumar ..................... G06T 7/70 |
| 2019/0317739 | A1* | 10/2019 | Turek ....................... G06F 8/10 |
| 2020/0019544 | A1 | 1/2020 | Rohde |
| 2020/0133692 | A1 | 4/2020 | Rohde et al. |
| 2020/0133693 | A1 | 4/2020 | Rohde et al. |
| 2020/0341602 | A1 | 10/2020 | Schoppe et al. |
| 2020/0341780 | A1 | 10/2020 | Andolina et al. |
| 2020/0387295 | A1 | 12/2020 | Schoppe et al. |
| 2021/0103969 | A1 | 4/2021 | Sollami et al. |
| 2021/0103970 | A1 | 4/2021 | Sollami et al. |
| 2021/0117484 | A1 | 4/2021 | Sollami |
| 2021/0117773 | A1 | 4/2021 | Sollami et al. |
| 2021/0118024 | A1 | 4/2021 | Sollami et al. |
| 2021/0118149 | A1 | 4/2021 | Sollami et al. |
| 2021/0149961 | A1 | 5/2021 | Lonsdorf et al. |
| 2021/0240318 | A1 | 8/2021 | Schoppe et al. |
| 2021/0240319 | A1 | 8/2021 | Schoppe et al. |
| 2021/0240452 | A1 | 8/2021 | Schoppe et al. |
| 2021/0240501 | A1 | 8/2021 | Woodward et al. |
| 2021/0240910 | A1 | 8/2021 | Lundin et al. |
| 2021/0334666 | A1 | 10/2021 | Lundin et al. |
| 2021/0406673 | A1* | 12/2021 | Pardeshi ................ G06N 3/045 |
| 2022/0101053 | A1* | 3/2022 | Litvak .................. G06K 9/6262 |
| 2022/0229969 | A1 | 7/2022 | Kukla et al. |
| 2023/0065433 | A1* | 3/2023 | Li ........................... G06V 10/82 |

FOREIGN PATENT DOCUMENTS

| | | | |
|---|---|---|---|
| EP | 3627342 | A1 | 3/2020 |
| EP | 3814890 | A1 | 5/2021 |
| WO | 2017180410 | A1 | 10/2017 |
| WO | 2018194852 | A1 | 10/2018 |
| WO | 2021155242 | A1 | 8/2021 |

OTHER PUBLICATIONS

Chen, Chunyang, Ting Su, Guozhu Meng, Zhenchang Xing, and Yang Liu. "From ui design image to gui skeleton: a neural machine translator to bootstrap mobile gui implementation." In Proceedings of the 40th International Conference on Software Engineering, pp. 665-676. 2018. (Year: 2018).*

Nguyen, Tam The, Phong Minh Vu, Hung Viet Pham, and Tung Thanh Nguyen. "Deep learning UI design patterns of mobile apps." In Proceedings of the 40th International Conference on Software Engineering: New Ideas and Emerging Results, pp. 65-68. 2018. (Year: 2018).*

Zheng, Xinru, Xiaotian Qiao, Ying Cao, and Rynson WH Lau. "Content-aware generative modeling of graphic design layouts." ACM Transactions on Graphics (TOG) 38, No. 4 (2019): 1-15. (Year: 2019).*

Jain, Vanita, Piyush Agrawal, Subham Banga, Rishabh Kapoor, and Shashwat Gulyani. "Sketch2Code: transformation of sketches to UI in real-time using deep neural network." arXiv preprint arXiv:1910.08930 (2019). (Year: 2019).*

J. Li, J. Yang, A. Hertzmann, J. Zhang and T. Xu, "LayoutGAN: Synthesizing Graphic Layouts With Vector-Wireframe Adversarial Networks," in IEEE Transactions on Pattern Analysis and Machine Intelligence, vol. 43, No. 7, pp. 2388-2399, Jul. 1, 2021, doi: 10.1109/TPAMI.2019.2963663. (Year: 2021).*

Kumar R, Talton JO, Ahmad S, Klemmer SR. Bricolage: example-based retargeting for web design. In Proceedings of the SIGCHI Conference on Human Factors in Computing Systems May 7, 2011 (pp. 2197-2206). (Year: 2011).*

Zheng S, Hu Z, Ma Y. Faceoff: Assisting the manifestation design of web graphical user interface. In Proceedings of the Twelfth ACM International Conference on Web Search and Data Mining Jan. 30, 2019 (pp. 774-777). (Year: 2019).*

Zhao T, Chen C, Liu Y, Zhu X. Guigan: Learning to generate gui designs using generative adversarial networks. In 2021 IEEE/ACM 43rd International Conference on Software Engineering (ICSE) May 22, 2021 (pp. 748-760). IEEE. (Year: 2021).*

Swearngin, Amanda, et al. "Rewire: Interface design assistance from examples." Proceedings of the 2018 CHI conference on human factors in computing systems. 2018. (Year: 2018).*

(56) References Cited

OTHER PUBLICATIONS

Lee, Hsin-Ying, et al. "Neural Design Network: Graphic Layout Generation with Constraints." arXiv preprint arXiv:1912.09421v2 (2020). (Year: 2020).*

Li, Jianan, et al. "Attribute-Conditioned Layout GAN for Automatic Graphic Design." IEEE Transactions on Visualization and Computer Graphics, vol. 27, No. 10, pp. 4039-4048, Oct. 1, 2021. (Year: 2021).*

Kikuchi, Kotaro, et al. "Constrained graphic layout generation via latent optimization." Proceedings of the 29th ACM International Conference on Multimedia. 2021. (Year: 2021).*

* cited by examiner

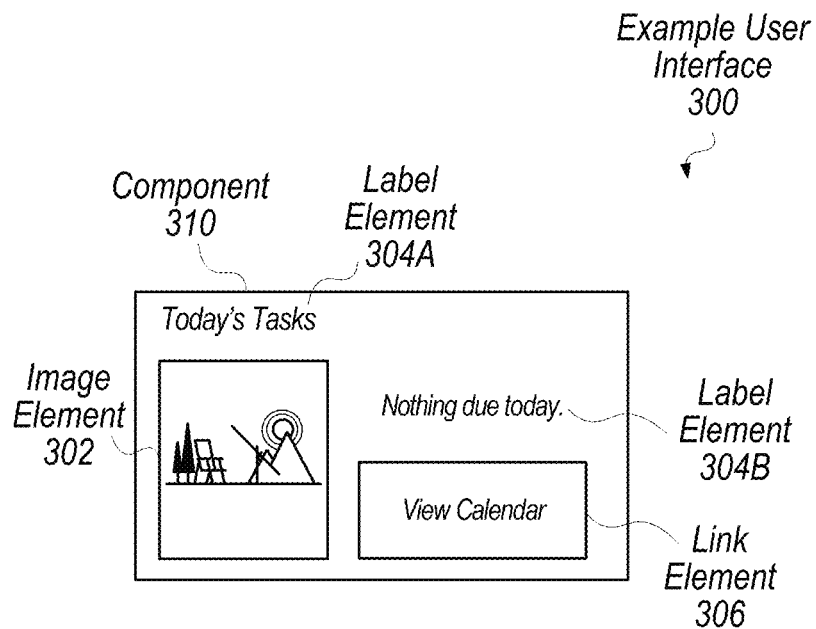
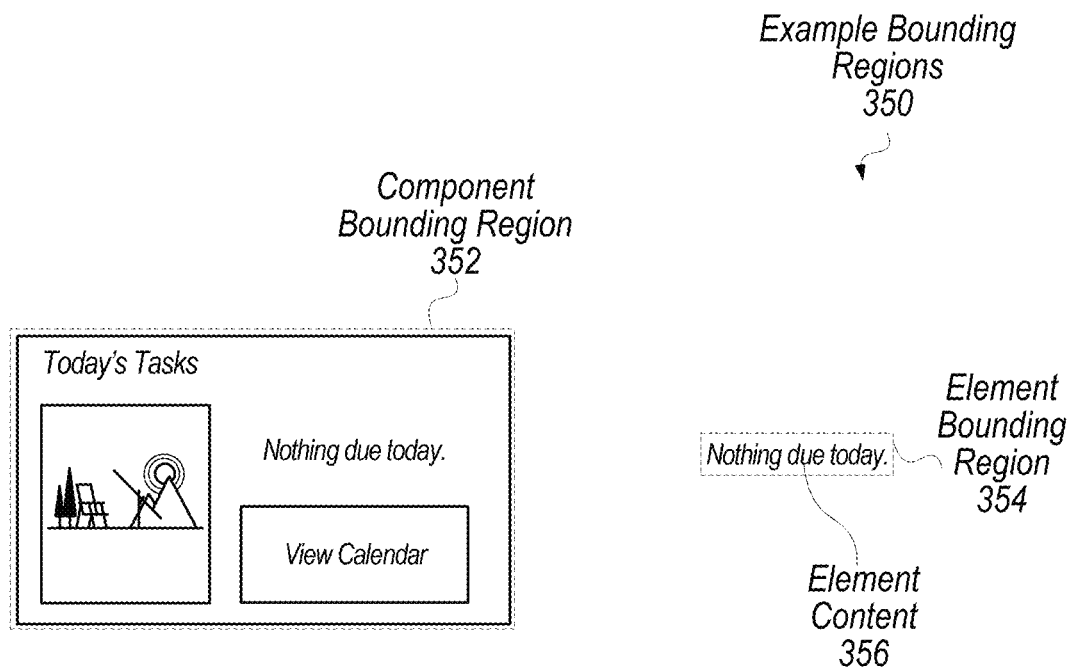
Fig. 3

1000 

Receive a layout image that includes a plurality of portions representing a plurality of user interface (UI) elements included in a UI design.
1010

Transform, by executing a trained residual neural network (ResNet), the layout image to a text-based representation of the layout image that specifies coordinates of bounding regions of the plurality of UI elements included in the UI design, wherein the text-based representation is usable to generate program code executable to render the UI design.
1020

Fig. 10

AUTOMATIC IMAGE CONVERSION

CROSS-REFERENCE

This application claims priority to U.S. Provisional application number 63/271,968 filed on Oct. 26, 2021. This application is related to U.S. Pat. No. 17/649,016 titled "One-to-Many Automatic Content Generation." The above-referenced applications are hereby incorporated by reference as if entirely set forth herein.

BACKGROUND

Technical Field

This disclosure relates generally to machine learning techniques, and, more specifically, to automating user interface design.

Description of the Related Art

User interfaces are often poorly developed or quickly become outdated as styles and design standards change. For example, a company may rebrand its business to have a new style; as a result, the company's website may need to be updated accordingly to match the new branding. In general, developers implement user interface updates by hand, which can be tedious, especially in cases where the program code for these user interfaces is poorly written (e.g., the user interfaces include large amounts of HTML <div> tags and handwritten cascading style sheets (CSS)).

BRIEF DESCRIPTION OF THE DRAWINGS

FIG. 3 is a block diagram illustrating an example UI and example bounding regions for constituent parts of the example UI, according to some embodiments.

FIG. 10 is a flow diagram illustrating an example method for transforming a layout image to a text-based representation of the layout image, according to some embodiments.

DETAILED DESCRIPTION

Figure 1:
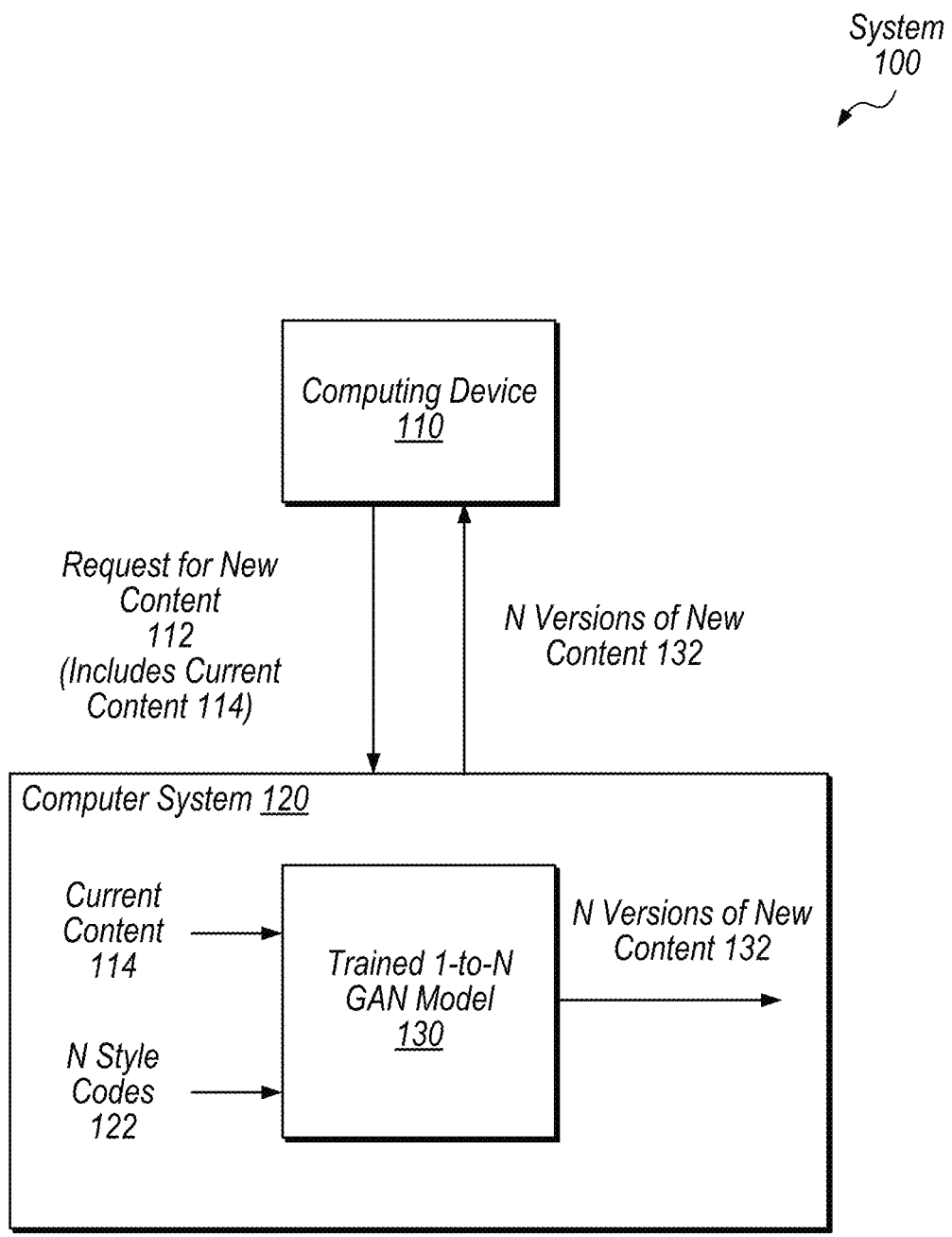
FIG. 1 is a block diagram illustrating a 1-to-N generative adversarial network (GAN) model, according to some embodiments.

In many situations, manual generation of user interfaces is time and resource intensive. For example, if an entity would like to alter or update one of their user interfaces (e.g., a homepage of their mobile application) once a day, week, month, etc., such alterations are often expensive as a user interface developer must manually implement these changes to the entity's UI according to the entity's desired visual for the interface. In addition to the manual generation of user interfaces being time and resource intensive, the process of designing UIs often includes bottlenecks, resulting in a slow production time. In order to decrease the amount of time and resources necessary to generate new UIs, a plurality of separate machine learning models may be executed by a software developer to automate one or more portions of the UI design process. In such situations, the software developer supervises the training and execution of the separate machine learning models and combines their output to produce a final new UI design during execution. Such techniques, however, often require training and execution of multiple separate automatic UI models to generate a single UI design. For example, separate automatic UI models may be trained to generate each or the following portions of a UI design: text features (size, font, emphasis, opacity, etc.), elements bounding regions, UI layout (locations of elements within a UI design), etc. Further, such techniques would require a UI developer (or some program code written by such a developer) to aggregate the output of these multiple separate models to generate a single UI design, which in turn, introduces inefficiencies into the automation process of UI design. Further, such techniques often fail to intelligently incorporate information about a style of a particular brand belonging to an entity requesting a new UI design or contextual information such as background imagery without manual instructions or rules provided by a user interface developer.

In order to solve the shortcomings of traditional techniques identified by the present inventors, the disclosed techniques learn about existing UI designs and generate new UI designs using a single model pipeline that is trained using a single set of inputs, rather than using multiple models each trained separately based on different UI inputs. For example, the disclosed UI automation system may generate a portion of or an entirely new UI (or multiple UIs, such as multiple web pages for a website) via a single execution of a UI model pipeline. In particular, the model pipeline may advantageously be able to understand the core aspects of UI design (e.g., layout, color, text properties, etc.) without manual intervention or supervision from a software developer. The disclosed techniques may further advantageously synthesize missing values from existing UI content when only a portion of UI content is available. For example, if only UI text and a background image is input to the disclosed UI automation pipeline, the pipeline will automatically generate an entire UI design including information specifying colors, a layout, and text for a UI design. The disclosed techniques automate the UI design process to save time and resources by executing a UI automation pipeline of multiple machine learning models.

One portion of the disclosed automation pipeline includes a generative model that automatically generates multiple new outputs (e.g., user interface designs) from a single set of inputs (e.g., a background image, text, buttons, images, components, etc.) that differ in the style code used to generate each of these outputs (e.g., a style code corresponding to a given brand such as Nike.com™). For example, each time a single set of inputs is sent to the generative model with a set of various different style codes, this model outputs multiple new designs (e.g., one design for each style code based on the single set of inputs). The disclosed GAN model provides a 1-to-N ratio in terms of input-to-outputs.

Although the disclosed techniques may be applied to automatically generate UI designs, the disclosed 1-to-N generative model is applicable to any of various generative design processes, including natural language processing, text recognition, facial recognition, speech recognition, or any of various generative design applications. Further, in the context of automating visual design, the disclosed techniques may be used for compositing (generating collages, videos, etc.), generating track selections for composite videos, generating new styles of different types of chrome, material styling of physical objects, altering styles of various UI elements or UI components, generating logos for in-painting a physical object such as a car in a photo-realistic way, generating iconography (generating text in an image e.g., in the header portion of the banner that includes text, auto-generate the text for the header), etc. The disclosed 1-to-N GAN model may advantageously produce multiple different styles of output from a single set of inputs, rather than one or multiple models generating individual styles one at a time (which may be both time and resource intensive). Such technique may improve the efficiency of overall automatic content generation. In the context of UI designs, the disclosed 1-to-N GAN model is a layout GAN included in a pipeline of models used to automatically generate new UI designs.

Another portion of the disclosed automation pipeline that may be utilized individually includes a residual neural network (ResNet) executable to transform a pixel layout image output by the disclosed layout GAN model into a text-based representation of the layout image. For example, the ResNet model may generate a JavaScript Object Notation (JSON) representation of a layout image that specifies, for example, where UI elements and UI components will be located over a background image when rendered. The JSON formatted representation of the layout image may advantageously allow for efficient exchange of UI information between a web server (e.g., a Salesforce™ server) and a web client. The disclosed techniques train a ResNet model to identify center points, widths, and heights of each pixel (where each pixel represents a different UI element) included in a pixelated layout image output by the layout GAN model and then generate a text-based representation of these dimensions. For example, the Image2JSON ResNet model outputs plain text specifying the locations and sizes of bounding regions of UI elements included in the layout image (the layout of UI elements included in a UI design). For example, the ResNet output specifies, in JSON format, the absolute bounding box coordinates of all UI elements included in a UI design. Alternatively, the Image2JSON ResNet may output plain text formatted using extensible markup language (XML) that represents the layout image output by the layout GAN model.

Example 1-to-N GAN Model

FIG. 1 is a block diagram illustrating a 1-to-N GAN model. In the illustrated embodiment, system 100 includes computing device 110 and computer system 120, which in turn includes a trained 1-to-N GAN model 130.

In the illustrated embodiment, computer system 120 receives a request for new content 112 that includes current content 114 from computing device 110. For example, computing device 110 may be a device of a user interface developer requesting new user interface designs, the device of a language specialist requesting natural language processing, etc. Computer system 120 inputs the current content 114 and N style codes 122 into a trained 1-to-N GAN model 130. Model 130 outputs N versions of new content 132. Computer system 120 then transmits the N versions of new content 132 to computing device 110. N can be any value greater than one. For example, trained 1-to-N GAN model 130 may generate five different versions of new content 132 based on current content 114 and five style codes 122.

In some embodiments, computer system 120 trains a GAN model to generate a trained 1-to-N model 130 capable of generating multiple versions of new content from a given set of current content. For example, as discussed below in further detail with reference to FIGS. 2 and 4, the 1-to-N model may be used to generate multiple different UI layouts for a new UI design. In such situations, the request for new content 112 is a request for a new UI design, while the current content 114 includes a current UI design e.g., a webpage being rendered to various users on a website. Further in this example situation, the N versions of new content 132 include two or more new UI layouts that may be used to generate one or more UI designs. In some embodiments, computer system 120 executes a pipeline of machine learning models to generate various new UI content to automatically generate an entire new UI design for computing device 110, as discussed in further detail below with reference to FIG. 2.

Example User Interface Generation System

Figure 2:
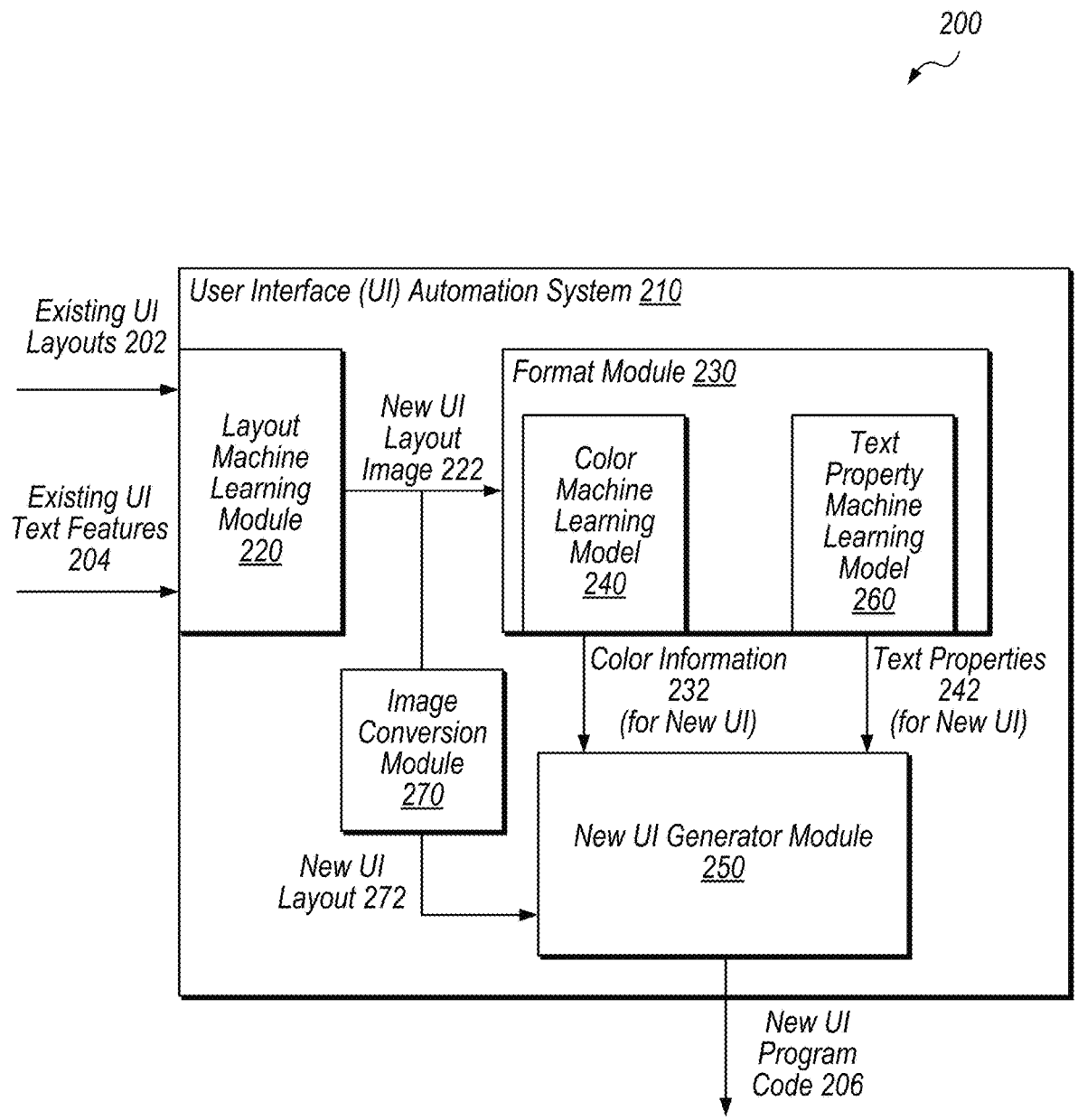
FIG. 2 is a block diagram illustrating an example user interface (UI) automation system configured to automatically generate UI designs, according to some embodiments.

FIG. 2 is a block diagram illustrating an example user interface (UI) automation system configured to automatically generate UI designs. In the illustrated embodiment, example 200 includes UI automation system 210, which in turn includes layout machine learning module 220, format module 230, image conversion module 270, and new UI generator module 250. UI automation system 210 trains and executes a pipeline of machine learning models to automatically generate new UI designs (i.e., new UI program code 206). For example, the model pipeline includes two different GAN models, one to generate UI layouts (executed by layout module 220) and another to generate UI colors (color machine learning model 240), an image to text conversion model (executed by image conversion module 270) used to convert images output by the layout GAN, and a text property model (text property machine learning model 260) used to generate text properties for text included in the layout image output by the layout GAN.

UI automation system 210 includes a pipeline of models used to automatically generate new user interface designs. For example, the disclosed pipeline model may use two different GAN models, one to generate UI layouts and one to determine colors for content within the UI layouts. Additionally, the disclosed techniques utilize a ResNet to determine properties for text in a new UI design (formatting including text font, text size, text weight, etc.).

UI automation system 210, in the illustrated embodiment, receives existing UI layouts 202 and existing UI text features 204, generates a new UI based on the current UI information, and outputs new UI program code 206. For example, UI automation system 210 may receive a request from a computing device used by a UI developer to generate a new UI for a given client. As one specific example, the client may be a merchant that would like a new website. In this example, a developer associated with the UI automation system 210 may submit a request to system 210 for this merchant. The developer may then transmit the new UI program code 206 to the merchant and the merchant may execute this program code to display the new UI on their website to various customers.

In various embodiments, user interface automation system 210 receives existing UI layouts 202 and existing UI text features 204 as a set of information for an existing UI. This set of information for an existing UI may include program code executable to render the existing UIs. For example, this information may include program code specifying various UI elements and UI components that make up an existing UI. The set of information for an existing UI may include the following: program code (e.g., JavaScript, cascading style sheets (CSS), etc.), markup files (e.g., Hypertext Markup Language (HTML)), screenshots, renderings, images, etc. of elements, components, or an entire user interface (including multiple UI elements and components). Information 202 and 204 may include image renderings and metadata associated with the image renderings. Further, the new UI program code 206 output by system 210 may also include HTML, JSON, image renderings (screenshots), metadata specifying coloring, metadata specifying text properties, etc. for a new user interface.

In some embodiments, UI automation system 210 scrapes UI material from websites. In such situations, system 210 parses the scraped data to generate clean sets of image renderings and corresponding metadata. In some embodiments, parsing the sets of data included in information scraped from websites includes organizing such data according to some parameter (e.g., by brand). After cleaning up the data scraped from websites, system 210 uses the clean datasets to train the disclosed pipeline of machine learning models.

In some embodiments, existing UI content is scraped from existing user interfaces of a given entity. For example, for a given entity that has a current branding and style of UI but would like a new branding and style of UI, the disclosed system will scrape UI content from this entity's website in order to get a fingerprint of this entity's user interface style. In other embodiments, the disclosed system scrapes UI content from any of various websites corresponding to various different entities. In such situations, the disclosed system may rate the existing scraped UI content based on various metrics. For example, the existing UI content may be rated based on how similar they are to a given entity requesting UI content, based on an artistic metric, based on design preferences specified by a given entity, based on industry standards for UIs, etc. The disclosed system may select existing UI content based on this content satisfying some threshold metric (e.g., artistic, brand conformity, the rule of thirds, alignment guidelines, etc.). Such content is then used to train the disclosed model pipeline. In other embodiments, a given client requesting new UI content generates a set of training data by specifying a set of rules (e.g., UI components must align with certain guidelines, UI content must obey the rule of thirds, etc.). The disclosed techniques then generate multiple synthetic user interface examples to train the pipeline of models.

After scraping existing UI content from existing websites, the disclosed techniques clean up the scraped content. For example, the scraped website code may have a completely different tree layout structure (the document object model (DOM) tree of the website) than the images of existing websites. As one specific example, it may be difficult to identify pieces of a button in the program code of the existing website. The disclosed system parses this scraped code to make sure that the components and layers of the UI specified in the code match what is shown in the image rendering of the UI. In some embodiments, the disclosed system separates UI data for different entities to produce individual sets of UI data for separate existing UI designs. For example, webpages for a first merchant (e.g., Salesforce Lightening) may be separated from webpages for a second merchant (e.g., Salesforce Classic).

Layout machine learning module 220 includes a layout machine learning model trained to generate new UI layouts from existing UI information (i.e., existing UI layouts 202 and existing UI text features 204). In some embodiments, the layout machine learning model is a GAN model. In the illustrated embodiment, layout machine learning module 220 sends a new UI layout image 222 generated by the layout model to format machine learning module 230 and image conversion module 270.

Image conversion module 270, in the illustrated embodiment, converts the new UI layout image 222 to a new UI layout 272. For example, the disclosed model pipeline also includes image conversion module 270 which in turn includes an image to JSON (JavaScript Object Notation) converter neural network. Image conversion module 270 converts a pixel image generated by the layout GAN to JSON format (i.e., plain text written in JSON format). In some embodiments, the converter neural network executed by module 270 is a residual neural network with multiple down-sampling layers. In some embodiments, the converter model executed by module 270 is a convolutional neural network. In the illustrated embodiment, image conversion module 270 sends new UI layout 272 to new UI generator module 250. Image conversion module 270 is discussed in further detail below with reference to FIGS. 6A and 6B.

Format module 230, in the illustrated embodiment, includes a color machine learning model 240 and a text property machine learning model 260. Format module 230 receives new UI layout image 222 and determines color information for this UI layout using model 240 and text properties for this UI layout using model 260. In the illustrated embodiment, color machine learning model 240 outputs color information 232 for a new UI design. Similarly, text property model 260 outputs text properties 242 for the new UI design. Format module 230 sends color information 232 and text properties 242 to new UI generator module 250. New UI generator module 250 outputs new UI program code 206 based on color information 232, text properties 242, and new UI layout 272. The new UI program code 206 is executable to render the new UI design automatically generated by UI automation system 210.

In some embodiments, color machine learning model 240 is a GAN model. System 210 trains the color GAN using a pixelated image, a brand identifier (ID), and bounding regions of UI components included in the layout image to output colors for each UI component included in the layout image (e.g., colors for text included in the header, body, button, etc. and color for the background of button, header box, etc.). The color GAN may have multiple input channels (e.g., the background image, UI element bounding regions, the background image, etc.). For example, the color GAN may identify that if the background image for a component of the UI layout is white, then the text included in this component (text that is overlayed on the white background of the component) should be black. Further, the output of the color GAN may include a pixelated image that is partitioned into "patches." For example, the pixel image output by the color GAN may include a pink patch associated with the header text of a new UI design, a black patch may represent the text for a button component, a purple patch may represent the background of the button component, etc.

The color machine learning model 240 included in format module 230 receives new UI layout image 222, which is an image that indicates the layout of a new UI design. Color model 240 outputs color information 232 for the new UI design. The color model 240 receives three inputs: a background image for the new UI design, a brand associated with the existing UI information 202 and 204 (e.g., a brand of a user requesting a new home page for their website), and the new UI layout image 222 output by a layout GAN included in layout machine learning module 220. The new layout image 222 includes multiple pixel boxes output by the layout GAN. The layout GAN outputs one channel for each pixel box and each channel is a single 256×256 stack binarized channel. As one specific example, for a new UI including five UI elements, the total number of channels input to the color machine learning model 240 is three channels for the UI background image (i.e., 3 channels for each of the pixel colors red, green, blue (RGB)) plus one channel for the brand integer plus five channels for the five pixel boxes (representing the five UI elements) included in the layout image output by the GAN model. In this specific example, the total number of channels input to the color model 240 is nine. Note that the number of pixel boxes included in the layout image output by the GAN model may be any of various numbers (i.e., the number of pixel boxes corresponds to the number of UI elements included in the layout for the new UI design) and is not limited to five pixel boxes.

Figure 7:
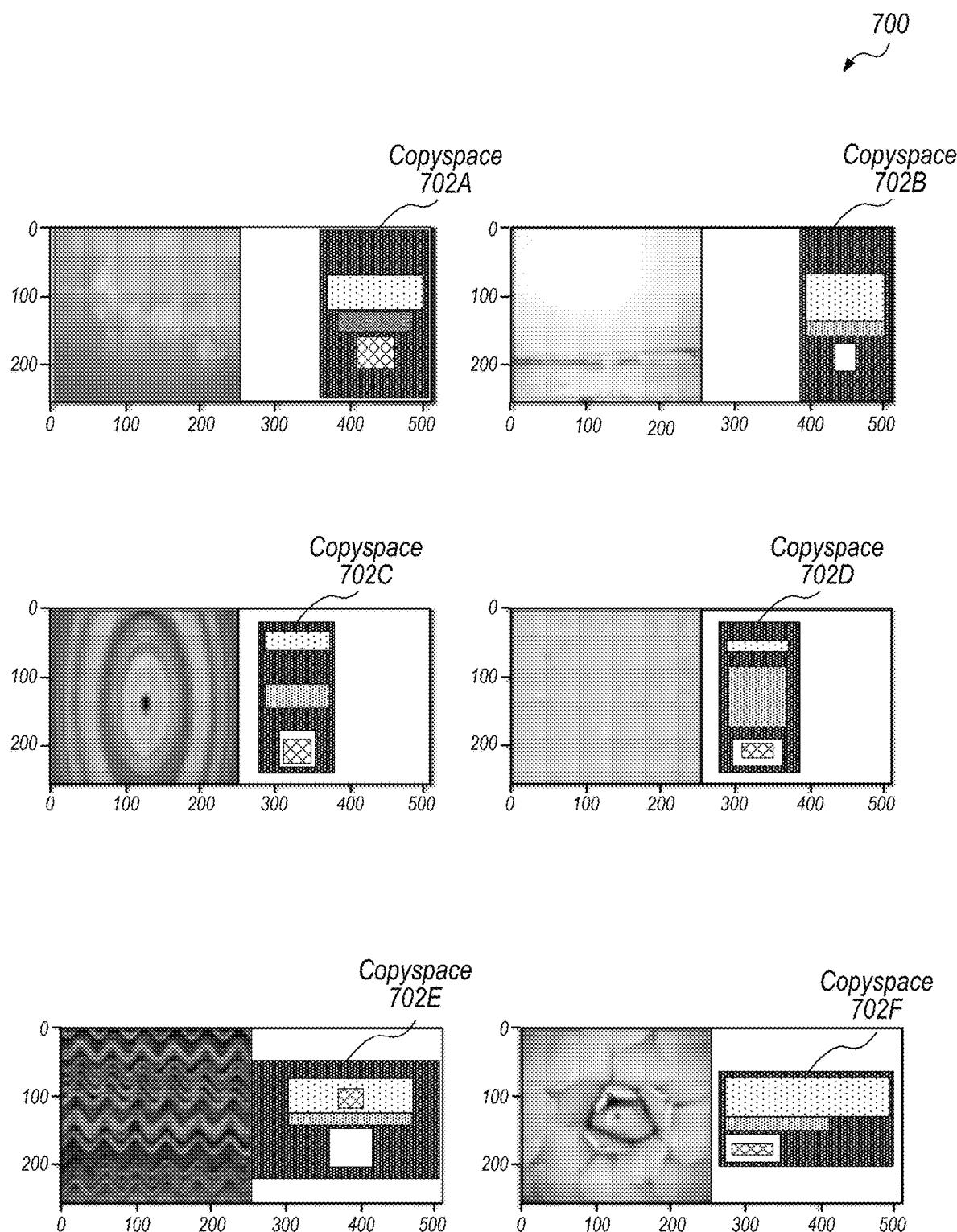
FIG. 7 is a diagram illustrating example pixel images representing UI layouts for different UI background images, according to some embodiments.
Figure 8:
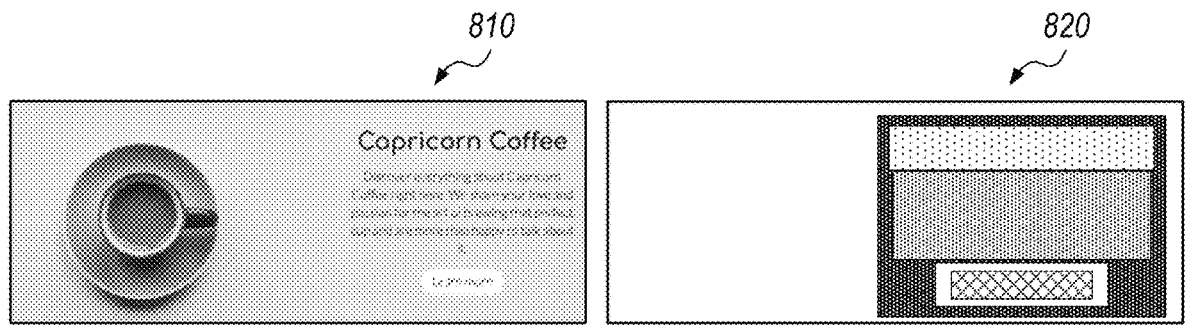
FIG. 8 is a diagram illustrating an example pixel image representing the layout for a UI banner, according to some embodiments.

The color information 232 for the new UI design output by color model 240 includes colors for the backgrounds of UI elements as well as colors for text UI elements included in the new UI design. As one specific example, if a layout image includes five different pixel boxes representing a copyspace, header text, body text, button text, and a button background, then the color information 232 output by the color model 240 includes a colored pixel box for the copyspace, a color for the header text, a color for the body text, a color for the button text, and a color for the button background. As used herein, the term "copyspace" refers to a portion of a UI design that UI elements or UI components will be placed. For example, a set of three UI elements might be placed together over a right portion of a coffee cup background image of a banner UI design such that they are not overlapping with the coffee cup background image included in the banner UI design (as shown in FIG. 8). Examples of different copyspaces are discussed below with reference to FIG. 7.

In some embodiments, the text property model 260 is a ResNet. The text ResNet model 260 receives new UI layout image 222 and existing UI text features 204 and generates text properties 242 for a new UI design including font, sizing, emphasis, etc. for the text of the new UI. The existing UI text features 204 may include header text, body text, link text, button text, etc. In some embodiments, text property model 260 determines the text itself for a new UI design. For example, even if text property model 260 does not receive existing text features 204 for existing UI designs, this model may determine what text to include in the new UI design based on the new UI layout image 222, a background image for the new UI design, etc. For example, the disclosed automatic pipeline of models may generate a new UI design with only an existing background image for the UI design, with or without text content, a brand ID, color information, or style code. As one specific example, existing UI text features 204 input to text property model 260 may be text phrases such as "Shop New," "Head in and let us help you bring your ideas to life," or any of various text for a header, title, body, etc. of existing UI designs. As one specific example, text property model 260 may receive new UI layout image 222, a brand ID associated with the existing UI information 202 and 204, color information 232 output by color model 240 (e.g., an image with bounding regions for UI elements filled in with colors), and existing UI text features 204. In this specific example, the text property model 260 outputs text properties for each text element included in the new UI design such as text size (e.g., 12 point), font type (e.g., Acta Display, Georgia serif, Adihaus-DIN-Bold, sans-serif, etc.), text weight (e.g., integer values on a scale from 100-900, where 400 is considered "normal" weighted text, and 700 is considered "bold" weighted text).

The first three inputs to text property model 260 are input in the same or similar format as the corresponding inputs to the color model 240 (i.e., background image, brand, and layout image). The text features 204, however, are input to the text property model 260 using a 256×256 stack binarized channel for each text feature (title text, body text, etc.). For example, each text feature will have two values: one number for the number of characters included in a given text feature and one for the number of words included in the given text feature. For example, model 260 encodes the length of characters and the word count for a given text feature to capture the width and height of the given text feature. The text properties 242 output by text property model 260 for the new UI design specify text sizes, text font, and text weight for each text feature input to the model. For example, if there are three different text features, header text, body text, and button text, then the model 260 will output 9 different properties (three for each of the three text features). As one specific example, the three text properties output by the text property model 260 for a header UI element include a text size (e.g., 12 point), a text font family (e.g., times new roman), and a text weight (e.g., bold).

System 210 may train models 240 and 260 to automatically identify color information and text features, respectively, for new UI designs as part of a single training process. For example, system 210 may train a layout model included in module 220, an image conversion model included in module 270, color model 240, and text property model 260 as a single pipeline of models using a given set of inputs. During the training process, system 210 inputs an existing UI design (including text features and a background image) and a vector of layout style codes into the layout GAN model included in layout machine learning module 220 to conditionally train the layout GAN model based on the layout style codes to predict different UI layouts with a custom loss function for a single set of UI data that includes a background image, brand ID, and text features. The training process executed by system 120 for the automated model pipeline proceeds with the predicted UI layout images output by the layout GAN being input to the text property model 260 (e.g., the text ResNet), the color model 160, and the image conversion model 270 (e.g., the image to JSON neural network). Based on the output of each of these models, system 120 may perform weight adjustments for each of the models. For example, system 120 inputs existing UI designs to the layout module 220 which passes a layout pixel image generated by the layout GAN model to the color, text, and image conversion models, respectively. In this example, the output of the color, text, and image conversion models is a single HTML UI design which can be rendered by executing the HTML.

In this disclosure, various "modules" operable to perform designated functions are shown in the figures and described in detail (e.g., layout machine learning module 220, format module 230, image conversion module 270, new UI generator module 250, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Example User Interfaces

FIG. 3 is a block diagram illustrating an example user interface 300 and example bounding regions 350 for constituent parts of the example user interface. In the illustrated embodiment, user interface 300 includes a component 310 and bounding regions 350 include a component bounding region 352 and an element bounding region 354. Component 310 may correspond to one "page" of a user interface 300 that has multiple pages in some embodiments. A given page of a UI may include one or more components, which, as described below, may include one or more elements.

Component 310, in the illustrated embodiment, includes various elements: image element 302, label elements 304, and link element 306. Note that label elements 304 include text; specifically label element 304A is a title and label element 304B is a description. Link element 306 is a button that is selectable to view a calendar. As used herein, the term "element" refers to the smallest granularity at which potentially-visible user interface items are specified. Individual images, text strings, links, etc. are examples of user interface elements. Similarly, as used herein, the term "component" refers to a set of one or more (typically multiple) user interface elements. For example, a user interface component may be a button that includes a text string and a link, or may include several buttons. In some embodiments, a UI includes a "banner," that includes at least one component. In some situations, a UI banner include multiple components (made up of one or more UI elements). Example UI banners are discussed in detail below with reference to FIGS. 8A and 8B.

Component bounding region 352, in the illustrated embodiment, encompasses an outer boundary (e.g., area) of component 310. In contrast, element bounding region 354 encompasses an outer boundary of label element 304B. The information included within the element bounding region 354 is referred to as the element content 356. As used herein, the term "bounding region" refers to the region encompassed within an outer boundary of one or more portions of user interface content and provides the size and position of the content within the user interface. For example, a bounding region may include the smallest possible measure (e.g., area, volume, etc.) around the outside of an element or component within a user interface. A bounding region may be an HTML bounding rectangle (which may also be referred to as bounding boxes). In some situations, a bounding region may include padding and a border, each with a thickness, that encompass the UI content of the bounding region.

In some embodiments, information specifying bounding regions may be used to generate stencils for content of a user interface prior to rendering of the UI. These stencils may be displayed to visually represent corresponding content of the user interface. For example, prior to rendering of user interface 300, one or more stencils may be displayed to represent an outline of component 310 as well as a general shape of elements 302-306 in order to visually communicate that the content for these elements and component are currently loading.

Example Layout Module

Figure 4A:
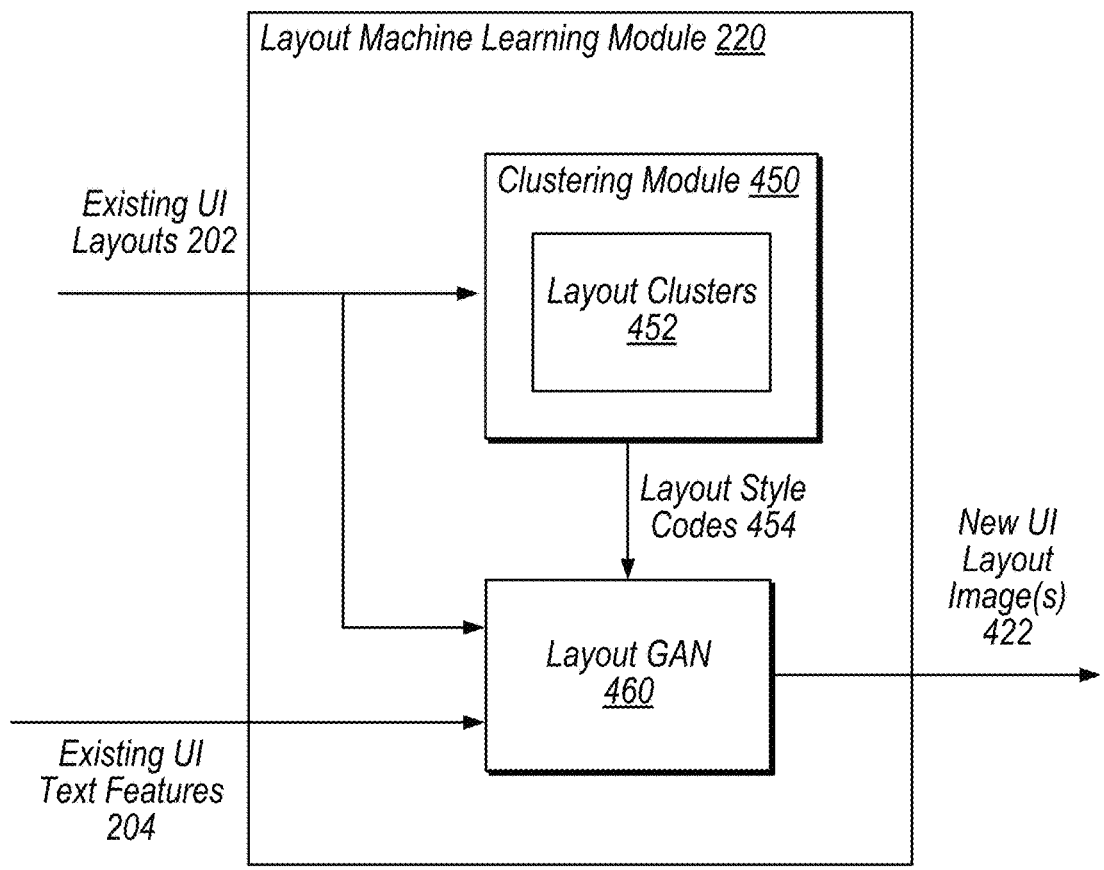
FIG. 4A is a block diagram illustrating an example layout machine learning module, according to some embodiments.

FIG. 4A is a block diagram illustrating an example UI layout module. In the illustrated embodiment, UI automation system 210 includes layout machine learning module 220, which in turn includes clustering module 450 and layout GAN 460.

Clustering module 450 receives existing UI layouts 202 and performs a clustering operation to generate layout clusters 452. For example, clustering module 450 may perform a k-means clustering method to determine visually salient clusters of similar orientation styles for UI designs. For example, a given salient cluster may include program code of multiple different UI designs that have the same layout clustered together (e.g., the UI designs have similar size bounding regions for similar UI elements, one or more similar types of UI elements, similar locations of UI components, similar orientations of UI elements, etc.). Example clusters that may be identified by clustering module 450 are discussed in further detail below with reference to FIG. 5. Based on the determined layout clusters 452, clustering module 450 assigns layout style codes 454 to visual salient clusters. For example, a style code may correspond to a UI design layout that overlays objects left-aligned on a background image. Layout style codes 454 may indicate a preferred alignment of UI elements or UI components within a UI layout. Layout machine learning module 220 utilizes style codes 454 to condition layout GAN 460 during training to produce certain orientations and locations for UI elements and UI components relative to one another within a UI design. In some embodiments, the orientation style codes 454 output by clustering module 450 are program code belonging to a given UI design represented by a data point at the center of a cluster identified by clustering module 450.

Figure 5:
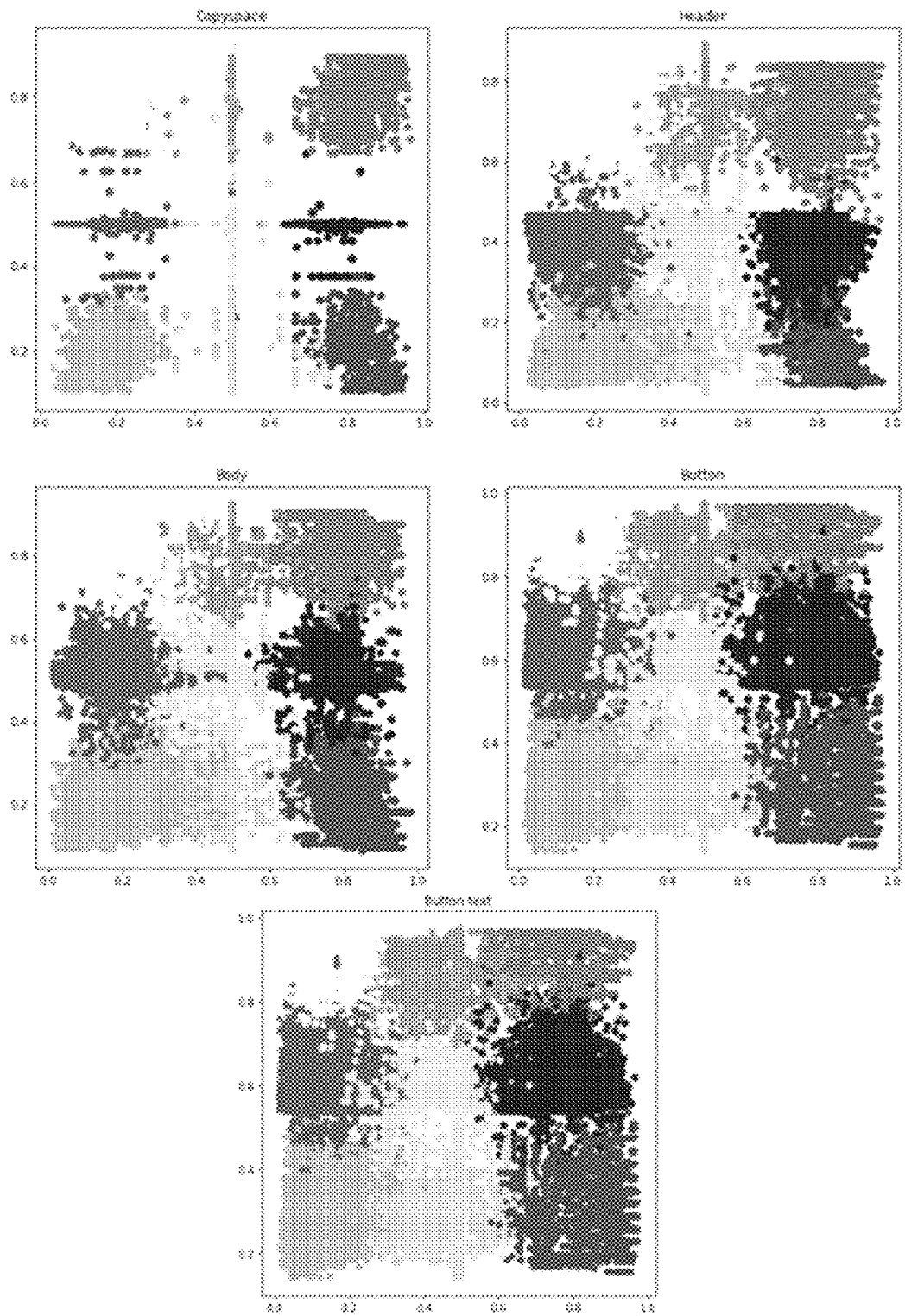
FIG. 5 is a diagram illustrating example style clusters, according to some embodiments.

Prior to performing a clustering operation, clustering module 450 may generate vectors that include the HTML of UI designs and cluster these vectors using a clustering method to produce visually salient clusters of UI data. The centers of these clusters may be referred to as centroids. The training of the layout GAN 460 is conditional on the centroids produced by clustering module 450 and labeled using layout style codes 454. In some embodiments, each element of a UI design (e.g., header text, body text, copy space text, button text, etc.) is represented by a rectangular centroid (having X and Y coordinates). Clustering module 450 clusters the vectors of UI data into various regions. For example, when executing a k-means clustering method, clustering module 450 may select k to be nine, such that the vectors of UI data are clustered into nine different regions. This clustering using nine different regions is illustrated in FIG. 5 via style clusters 510.

In the illustrated embodiment, the layout style codes 454 are then input to layout GAN 460 in addition to existing UI text features 204 and layout GAN 460 automatically outputs new UI layout images 422 for new UI designs. For example, the layout GAN 460 may use the text of a Hemmingway poem and a style code of 11 (e.g., indicating to make the UI look like the emotion "sad") to generate a first new UI design. The layout GAN 460 may then use the same text of a Hemmingway poem and a style code of 12 (e.g., indicating to make the UI like the emotion "happy") to generate, a second, different UI design (but one that has the same set of input features as the first UI design, except for the differing style codes). For example, the following may be input into layout GAN 460: a UI background image (e.g., a picture of a coffee mug such as that shown in FIG. 8), a brand ID (an identifier of a brand associated with an entity requesting a new user interface design), a layout style code 454 (obtained from the cluster with which an existing UI design is represented), and text features 204 gathered from the metadata of existing UI designs. The layout style codes 454 include codes representing the center of layout clusters 452 identified by clustering module 450. In the illustrated embodiment, layout GAN 460 outputs new UI layout image(s) 422 based on the layout style codes 454, existing UI layouts 202, and existing UI text features 204.

In some embodiments, layout machine learning module 220 is configured to select a single new UI layout image 422 output by layout GAN 460 and then send this selected new layout image 422 to format module 230 and image conversion module 270 included in UI automation system 210 (i.e., included in the UI design model pipeline). In other embodiments, layout machine learning module 220 sends multiple new UI layout images 422 to both the format module 230 and image conversion module 270 (discussed above with reference to FIG. 2), such that UI automation system 210 outputs multiple new sets of UI program code 206 for multiple different UI designs for a given entity which were generated based on the multiple new UI layout images generated by layout machine learning module 220. The new UI layout image(s) 422 output by module 220 include an RGB image of pixels, where each pixel represents a different portion of a layout image (e.g., where the portions are different UI elements included in a given UI design). Examples of UI layout images are shown in FIG. 7 using various types of shaded pixel rectangles (the shading shown in the figure represents the different pixel colors included in each rectangle that indicate the size and locations of various UI elements).

Layout machine learning module 220 inputs existing UI text features 204 (e.g., header text, body text, etc.), a background image, an integer corresponding to a given brand, and multiple style codes into layout GAN 460 in order to generate multiple new layout images 422 for a new UI design. The background image input to layout GAN 460 may be an RGB matrix image in the form of [256, 256, 3], where each RGB pixel in the image matrix is represented by a 256×256 binarized encoded bit with one of the three different colors, red, green, or blue. The brand integer input to layout GAN 460 may be an integer e.g., from 1-11 that has been one-hot encoded by layout module 220 prior to being input into layout GAN 460. For example, if there are eleven different brands, module 220 assigns an integer to each of these eleven brands e.g., alphabetically. During training, the layout GAN 460 is conditioned on these one-hot encoded brand integers such that the model learns that integer one belongs to a jewelry merchant, integer two belongs to a clothing merchant, integer three belongs to a gas station, etc. In this way, during training layout GAN 460 begins to associated UI designs for jewelry merchant with the integer one, for example. The existing UI text features 204 input to layout GAN 460 may include, for example, body text and link text for an existing UI design.

In some embodiments, layout machine learning module 220 performs various pre-processing on UI data prior to inputting this data into layout GAN 460. For example, as discussed above, each brand is represented via a one-hot encoding process that converts brands to integers. Further in this example, if there are three separate brands that will be used to train layout GAN 460, then module 220 will generate three separate channels: [1,0,0] for the first brand, [0,1,0] for the second brand, and [0,0,1] for the third brand. Layout GAN 460 takes two-dimensional input, so a given brand channel input to layout GAN 460 would be represented by 256×256×3 if these are three different channels (corresponding to three different brands). In some situations, the number of brands (and therefore the number of channels) is greater than 100. In such situations, module 220 performs additional pre-processing to compress the brand input to cut down the number of channels being input to layout GAN 460 which may advantageously improve the calculation efficiency of layout GAN 460, which in turn will improve the speed at which the disclosed system generates new UI designs.

Figure 4B:
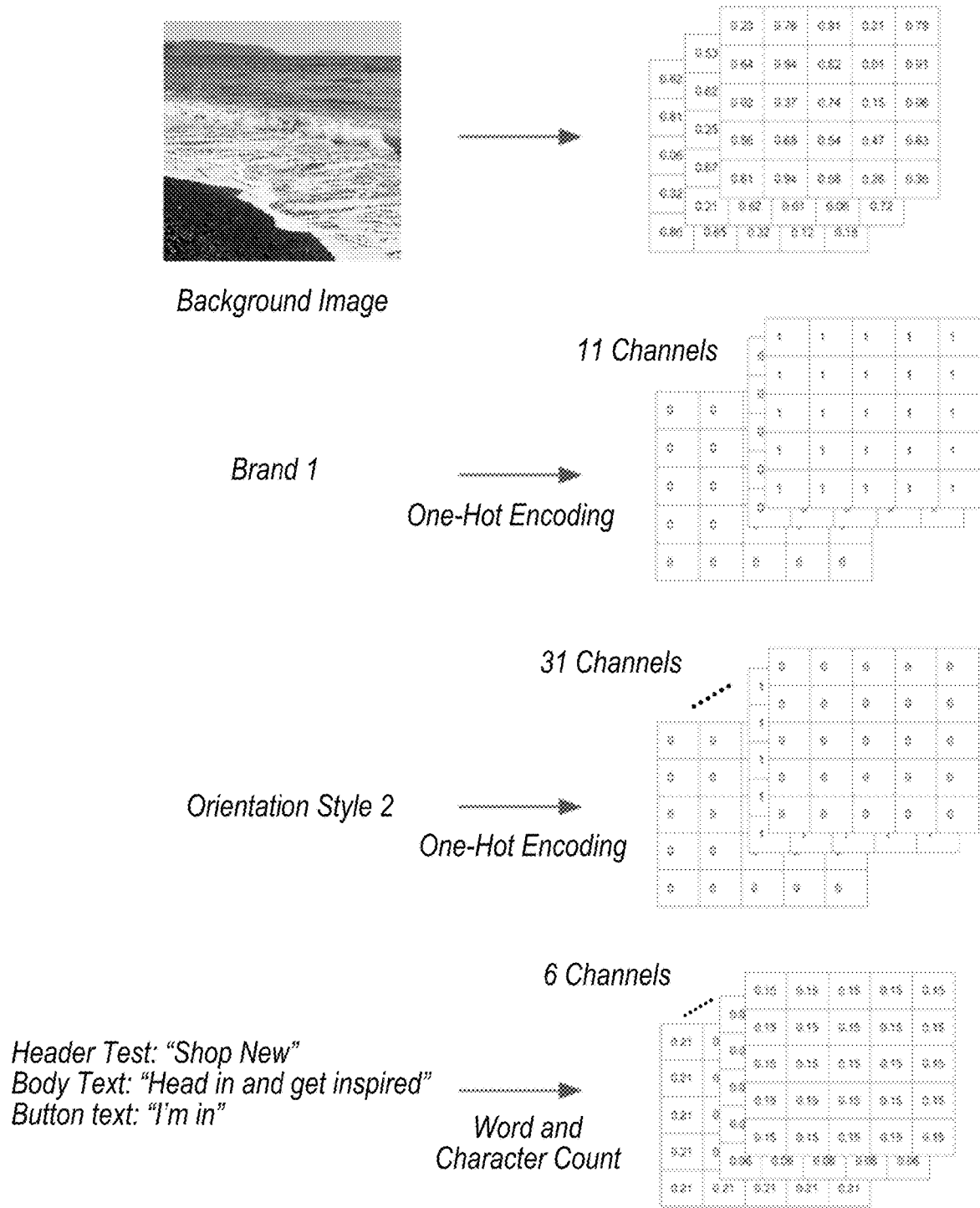
FIG. 4B is a diagram illustrating example encoding performed by layout machine learning module, according to some embodiments.

Similar to the one-hot encoding performed on the brands, module 220 also performs one-hot encoding on the layout style codes 454 prior to inputting these codes into layout GAN 460. For example, if we have 31 different style codes, then 31 different one-hot encoded channels are input to layout GAN 460. Module 220 preprocesses existing UI text features 204 prior to inputting them to layout GAN 460 by determining the number of characters included in a given text feature (e.g., header text) and then dividing by 100. Module 220 then generates a 256×256 channel for the number of characters included in each text feature (e.g., header text, body text, etc.). Module 220 performs this same process a second time for the length of characters included in text features (determine the length of characters and then divide by 100). For example, module 220 also generates a 256×256 channel for the length of the characters included in each text feature. In this way, layout GAN 460 will learn the width and height of each text feature (i.e., based on the length of the characters and number of characters included in each text feature). The input into layout GAN 460 is in the form of a tensor that includes: 3 channels for the RGB background image, 3 channels for the 3 different brands, 2×3 channels for the three different text features (and the length and number of characters in each text feature) and 31 channels for the style codes=43 channels included in the input tensor. FIG. 4B illustrates example encoding performed by layout machine learning module 220 in order to generate new layout images 422.

The new UI layout images 422 output by layout GAN 460 for a given set of inputs (i.e., background image, brand, multiple style codes, and text features), include a UI layout image 422 for each style code input to layout GAN 460 represented by different rectangles indicating the sizes and locations of a plurality of UI elements included in a new UI design (e.g., pixel rectangles for title text, body text, button shape, button text, etc.). FIG. 7 shows several examples of layout images that might be output by layout GAN 460.

Although layout GAN 460 is discussed herein in the context of automatic UI design generation, note that the operations performed by layout GAN 460 may be performed to automate any of various processes, including: speech recognition, image recognition, etc. The 1-to-N (input-to-output) performed by layout GAN 460 may be applicable to any of various processes that may benefit from automation as discussed above with reference to FIG. 1.

Example Clustering

FIG. 5 is a diagram illustrating example style clusters. In the illustrated embodiment, five different example style clusters 510 are shown for the following UI elements and UI components: copyspace, header text, body text, button, and button text. Copyspace is a UI component including the following UI elements: header text, body text, button, and button text. The combination of the button shape and the button text is also a UI component. The example style clusters 510 shown in FIG. 5 may be generated by the clustering module 450 executed by layout machine learning module 220 as discussed above with reference to FIGS. 4A and 4B.

Layout module 220 (shown in FIGS. 2 and 4) determines style codes 454 (shown in FIG. 4A) by scraping UI content from existing UI designs. For example, layout module 220 may scrape UI content from 1000 different websites, clean up the scraped content (e.g., if the program code of the scraped content does not conform to certain design standards), cluster the clean, scraped content, and then select the top 500 clustered layouts as the 500 top layout styles to be used when generating new UI designs for a given entity. For example, prior to inputting the scraped UI design data, layout module 220 may perform a clustering (e.g., k-means) method to organize image renderings and associated metadata by brand. This clustering is performed by separating UI data for different entities (e.g., clients, merchants, etc.) and observing graphical patterns of the UI data (e.g., identifying clusters within the UI data).

In FIG. 5, five different example style clusters 510 are shown with varying levels of visual salience for different locations of UI elements within respective UI designs. For example, the copyspace style cluster 510 includes nine different visually salient clusters, showing nine different locations within a UI design that the copyspace component is generally located (e.g., top left, top center, top right, middle left, middle center, middle right, bottom left, bottom center, bottom right). The program code of a UI design located at the center of each of these nine copyspace clusters may then be used to generate the layout style codes 454 discussed above with reference to FIG. 4A. The style clusters 510 are generated using a cluster size of nine (i.e., generate nine difference clusters) based on the following ten UI metadata values: "copyspace_center_x," "copyspace_center_y," "header_center_x," "header_center_x," "body_center_x," "body_center_y," "button_center_x," button_center_y," "buttontext_center_x," "buttontext_center_y." For example, the nine clusters generated for the copyspace of UI designs include nine visually salient clusters for the copyspace UI element, where the clusters are generated based on the x and y dimensions of the copyspaces of various UI designs. The UI metadata "header_center_x" for example indicates the x coordinate of the center of the bounding box for the header UI element. Similarly, "header_center_y" indicates the y coordinate of the center of the bounding box for the header UI element. Further, UI metadata "header_w" and "header_h" indicate the width and height of the bounding box of the header UI element, respectively.

As one specific example, the style clusters 510 shown in FIG. 5 may be generated from the UI layouts of ten different UI designs. In this example, clustering module 450 computes the bounding box features of UI elements and components for each of the ten different UI designs. For example, if a given UI design includes five different elements/components, then the clustering module 450 will generate 20 different bounding box features for this UI design (i.e., four UI metadata values for each element/component). Based on this generated UI metadata, clustering module 450 generates style clusters 510 such as those shown in FIG. 5. The result of this style clustering, in this specific example, is four different visually salient style clusters (e.g., style cluster 1, style cluster 2, style cluster 3, and style cluster 4) that indicate the most common Ui layouts based on the UI layouts of the ten different UI designs.

Example Image Conversion Module

Figure 6A:
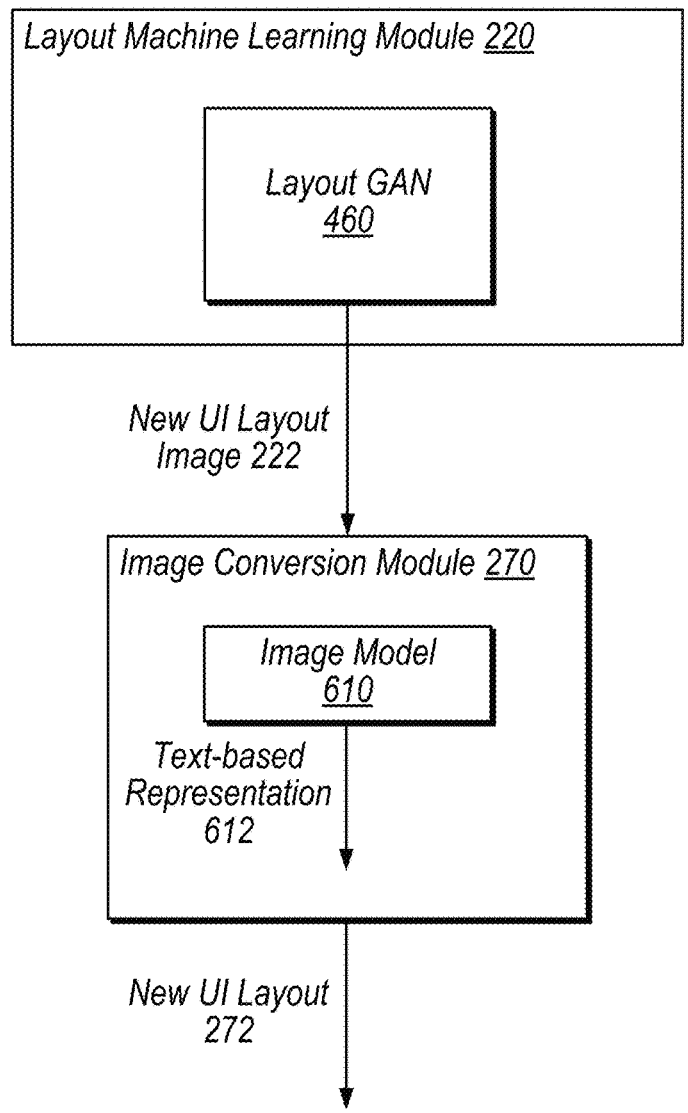
FIG. 6A is a block diagram illustrating an example image conversion module, according to some embodiments.

FIG. 6A is a block diagram illustrating an example image conversion module. In the illustrated embodiment, user interface automation system 210 includes layout machine learning module 220, which in turn includes layout GAN 460, and image conversion module 270, which in turn includes image model 610. Image conversion module 270, in the illustrated embodiment, receives a new UI layout image 222 and outputs new UI layout 272.

Image model 610 receives a new UI layout image 222 from layout GAN 460 and generates a text-based representation 612 of the image. These layout images include RGB pixel rectangles with bounding regions. For example, the new UI layout image 222 input to image model 610 includes pixel rectangles that each have a color, XY coordinate pairs, and a width and height. Based on these input layout images, image model 610 outputs a text-representation 612 of the new UI layout image 222 in the form of XY coordinates and width and height for each UI element included in the layout image. For example, image model 610 converts the pixelated image to JSON format, which can then be rendered using HTML. The text-based representation 612 may be in JSON format, XML format, etc. and includes a list of bounding regions with coordinates specifying e.g., the XY and width and height of button text included in the new UI layout image 222. In some situations, the image model 610 is a fully synthetic model. For example, image model 610 may be a ResNet that includes additional down-sampling layers in comparison with the residual neural network used to generate the text property model 260 shown in FIG. 2.

In some embodiments, layout GAN 460 outputs multiple different new UI layout images 222 for a single UI design. For example, layout GAN 460 may output three different layouts (with different locations for a set of UI elements overlayed on a single background image) for a single new UI design. In this example, image conversion module 270 converts the three layout images to three different text-based representations 612 and generates three new UI layouts 272 for the three different text-based representations 612. Further in this example, the UI automation system 210 may select a single one of the three new UI layouts 272 to be used to generate the new UI program code 206 shown in FIG. 2 or may generate three different sets of new UI program code 206. In this example, a user (e.g., a UI developer or an entity requesting a new webpage) may select from the three different sets of new UI program code 206 or may use all of them for rendering e.g., at different times.

Image conversion module 270 trains image model 610 by inputting multiple layout images (output by layout GAN 460 during the model pipeline training process) into the model and adjusting weights based on the text-based representations output by model 610. During training, image conversion module 270 teaches a ResNet to identify center points, widths, and heights of each pixel included in the new UI layout image 222. In some embodiments, image conversion module 270 uses synthetic layout images to train image model 610. For example, image conversion module 270 may synthetically generate hundreds of thousands of synthetic layout images and add these to a set of layout images output by layout GAN 460 to train image model 610. Image conversion module 270 does not require a UI developer to label the images 222 prior to using these images to train image model 610. The training and execution of image model 610 is performed automatically and, as such, advantageously removes or reduces the need for management by a UI developer. The text-based representation 612 output by model 610 allows for quick and compact communication of UI data between a server (e.g., UI automation system 210) and a web browser or web application of a client device used to render a UI.

Figure 6B:
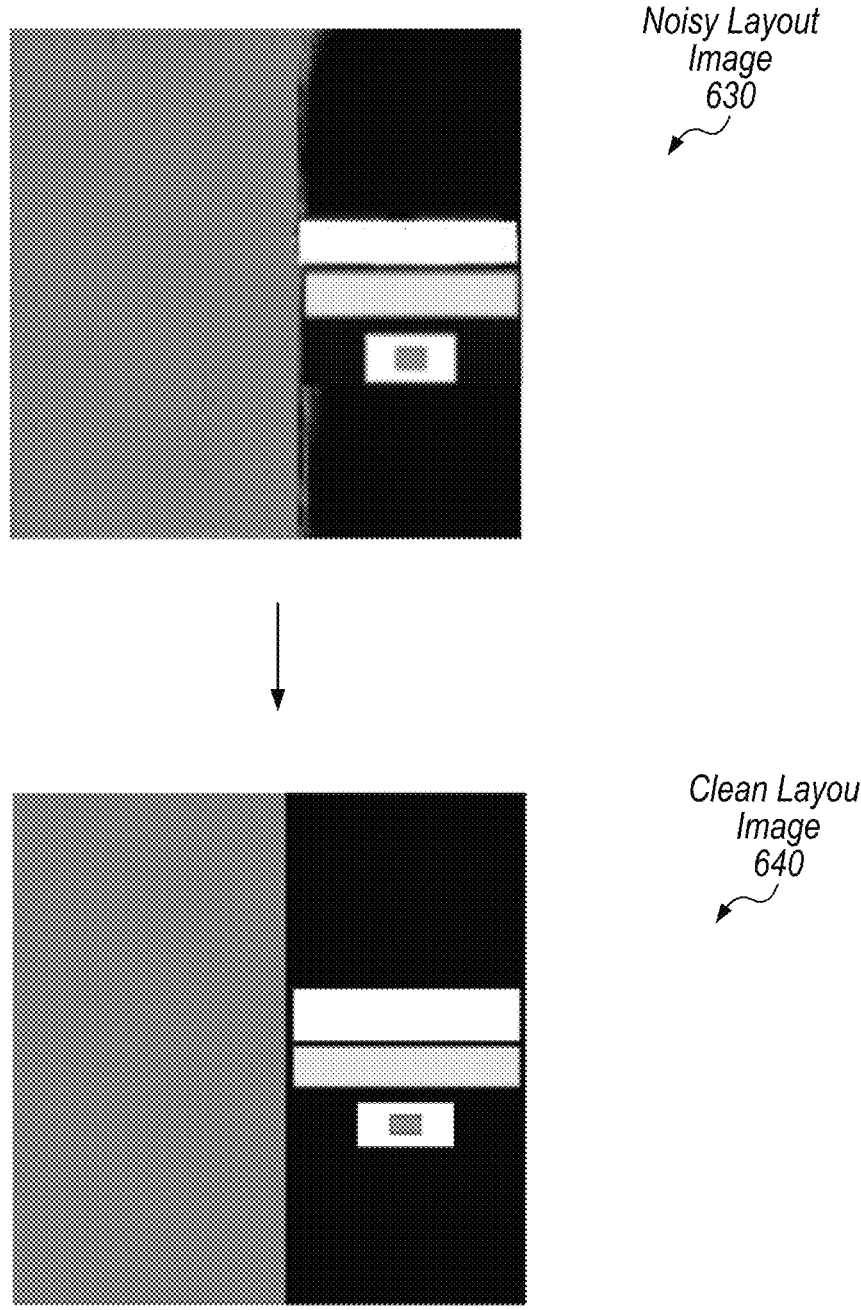
FIG. 6B is a diagram illustrating example noisy and clean layout images, according to some embodiments.

In some embodiments, image conversion module 270 preprocesses UI layout images used to train model 610 by adding noise to these images prior to using the images to train model 610. For example, module 270 may add portions of random RGB noise to layout images to more accurately simulate the run-time situation in which layout GAN 460 outputs new UI layout images 222 with noise and then image model 610 has to convert noisy RGB layout images to a text-based representation. For example, the pixel images output by the layout GAN 460 may have some noise and image conversion module 270 uses the output of the layout GAN during training to figure out what kind of noise should be added to the output of the layout GAN and any other layout images used during training of the image model 610. FIG. 6B shows an example noisy UI layout image 630 and an example clean layout image 640 that was generated by image conversion module 270 performing smoothing operations on the noisy image 630.

In some embodiments, image conversion module 270 performs additional smoothing operations on the text-based representation 612 output by image model 610 prior to generating the program code for new UI layout 272. For example, if the bounding box coordinates output by image model 610 are not exactly center in their alignment, either relative to the overall layout or relative to one another, module 270 may perform some operations to snap the bounding regions to absolute coordinates. As used herein, the term "absolute coordinates" is intended to be construed according to its well-understood meaning which includes coordinates that reference the position of an object with respect to an origin in a given coordinate system. In some situations, module 270 generates flex-box coordinates from the bounding box coordinates output by image model 610. These flex-box coordinates include written text in a web page that can scale appropriately according to the device being used to render the web page.

In the illustrated embodiment, image conversion module 270 takes the text-based representation 612 and generates a new UI layout 272 by generating program code (e.g., new UI program code 206 shown in FIG. 2) that is executable to render a new UI design. For example, the text-based representation 612 may be JSON formatted UI design layout and image conversion module 270 may use this JSON plain text to generate HTML or CSS that specifies the locations that UI elements are to be rendered over a background image included in a new UI design. In other embodiments, image conversion module 270 transmits the text-based representation 612 directly to a client's web browser or web application without performing any additional conversions of the UI data (e.g., to HTML or CSS). In various situations, UI automation system 210 renders the HTML for a given generated UI design for a given brand by snapping the absolute coordinates output by the image conversion module 270 into a 12×12 grid. Then, UI automation system 210 embed divs of the design with appropriate CSS text styling, padding, and margins for each component from the output of the style model.

Example UI Layout Images

FIG. 7 is a diagram illustrating example pixel images representing UI layouts for different UI background images. In the illustrated embodiment, examples 700 include six different banner layout images (shown within white boxes on the right-hand portion of each of the six examples) and grayscale background images (shown on the left-hand portion of each of the six examples). The layout images shown in FIG. 7 are examples of the layout images 222 and layout images 422 discussed above with reference to FIGS. 2 and 4, respectively.

In the illustrated embodiment, each of the six layout images is shown within a white box next to the background image over which the UI elements represented within the layout images are to be displayed. The background images shown on the left next to each of the six layout images are generally provided by an entity requesting a new UI design (e.g., the background image is not output by the layout GAN model). For example, the top left-most layout image shows several rectangles that occupy the right portion of the UI layout image (the white box). These rectangles represent the locations of various UI elements and UI components that will be overlayed on the cloud image next to the top left-most layout image. For example, the shaded rectangles shown on the right side of each of the six background images in FIG. 7 illustrate the locations that the disclosed model pipeline is predicting that one or more UI elements or UI components will be overlayed on their respective background images.

The layout images included in FIG. 7 include respective copyspaces 702A-702F. For example, copyspace 702A is represented using a dark grey shaded rectangle that occupies a large right-hand portion of the UI layout image. The copyspace 702A is the space in which UI elements included in the UI design will be arranged and displayed. In some embodiments, the shaded rectangles included in the layout images are each displayed using a different color as discussed in further detail below with reference to FIG. 8.

Turning now to FIG. 8, a diagram is shown illustrating an example pixel image representing the layout for a UI banner. In the illustrated embodiment, a rendered UI design 810 of a banner (e.g., displayed on a webpage of a coffee merchant) is shown on the left and a pixel image layout 820 for the UI design is shown on the right. Image layout 820 includes five different shaded bounding regions. The square bounding box in the left portion of layout 820 indicates the location of the background image of a coffee cup. This square bounding box may be represented using the color navy blue, for example. Similarly, the top most rectangle in layout 820 that includes polka dots indicates the location of the header text "Capricorn Coffee" and may be represented using the color yellow. Further, the middle rectangle shown on the right side of layout 820 indicates a location of the body text "Discover everything about Capricorn Coffee right here. We share your love and passion for the art of brewing that perfect cup and are more than happy to talk about it." This rectangle may be represented within layout 820 using the color sky blue. Still further, the bottom two, smaller rectangles shown on the right side of layout 820 represent the text "Learn more" of a button and the outer shape of the button, respectively. The smaller cross-hatch shaded rectangle represents the text "Learn more," while the larger white box represents the oval background shape of the button. The cross-hatch shaded rectangle may be represented within layout 820 using the color red, while the white rectangle may be represented using the color white within layout 820. The layout 820 shown in FIG. 8 is one example of a new UI layout image 422 that may be output by the layout GAN 460, as shown in FIG. 4A.

Example Methods

Figure 9:
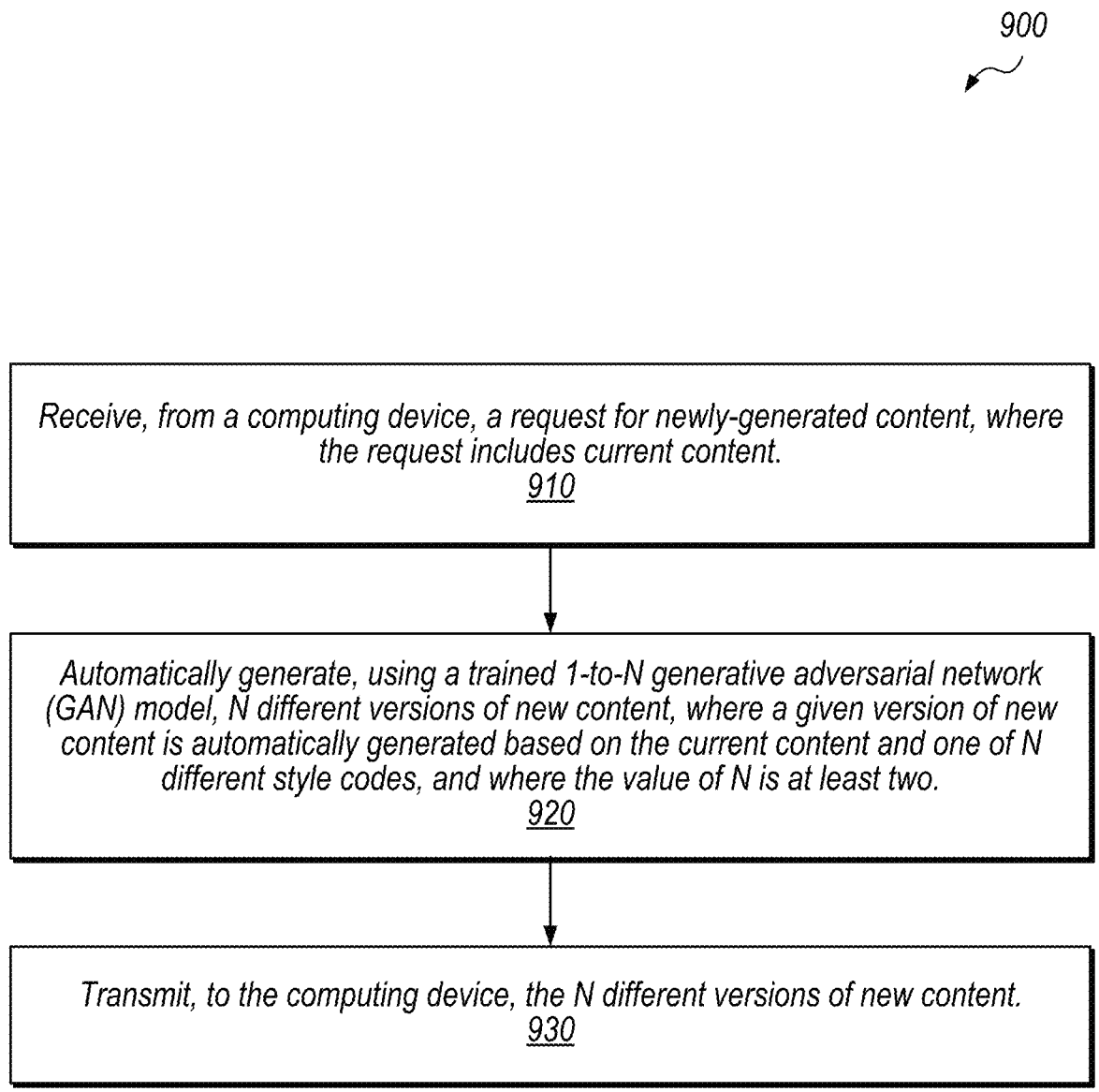
FIG. 9 is a flow diagram illustrating an example method for automatically generating N versions of new content using a trained 1-to-N GAN model, according to some embodiments.

FIG. 9 is a flow diagram illustrating a method 900 for automatically generating N versions of new content using a trained 1-to-N GAN model, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, computer system 120 performs the elements of method 900.

At 910, in the illustrated embodiment, a computer system receives, from a computing device, a request for newly-generated content, where the request includes current content. In some embodiments, the current content includes information specifying a current user interface (UI) design, where the 1-to-N GAN model is a layout GAN model. In some embodiments, generating the N different versions of the new content includes automatically generating multiple new layouts for a new UI design.

At 920, the computer system automatically generates, using a trained 1-to-N generative adversarial network (GAN) model, N different versions of new content, where a given version of new content is automatically generated based on the current content and one of N different style codes, and where the value of N is at least two. In some embodiments, each of the N different versions of the new content are automatically generated using a different one of the N different style codes. For example, the number of style codes is equal to the number of different versions of new content generated by the 1-to-N GAN model.

In some embodiments, the computer system performs, on different sets of current content associated with a plurality of different entities, a clustering operation. In some embodiments, the computer system determines, based on a plurality of orientation-style centroids generated during the clustering operation, a plurality of different style codes, wherein the N different style codes are selected from the plurality of different style codes. In some embodiments, the clustering operation is a k-means clustering operation, where the plurality of different style codes are determined based on centers of one or more clusters generated during performance of the k-means clustering operation. In some embodiments, the plurality of different style codes correspond to a plurality of different UI design layouts. In some embodiments, the computer system obtains the different sets of current content associated with a plurality of different entities by scraping, from a plurality of websites, information specifying one or more existing UI designs, where the information includes program code and image renderings for respective ones of the one or more existing UI designs.

In some embodiments, the clustering operation is a k-means clustering operation, where the plurality of different style codes are determined based on centers of one or more clusters generated during performance of the k-means clustering operation. In some embodiments, the plurality of different style codes correspond to a plurality of different UI design layouts.

In some embodiments, the computer system generates, using a color GAN model, a set of colors for UI elements included in the new UI design, where determining the set of colors is performs by inputting at least one of the multiple new layouts for the new UI design into the color GAN model. In some embodiments, the computer system generates, using a residual neural network (ResNet), a set of properties for text elements included in the new UI design, where the generating includes inputting at least one of the new layouts for the new UI design and one or more text elements included in the new UI design into the ResNet. In some embodiments, automatically generating the multiple new layouts for the new UI design includes automatically generating multiple different layout images that include a plurality of portions with different pixel colors representing a plurality of elements included in the multiple new layouts for the new UI design.

In some embodiments, the computer system executes a trained ResNet to transform respective ones of the multiple new layouts to text-based representations of the new layouts that specify, for respective layouts, coordinates of bounding regions of the plurality of elements included in the multiple different layout images, where the text-based representations are usable to generate program code executable to render respective ones of the multiple new layouts. In some embodiments, the computer system transmits, to the computing device, the program code for respective ones of the multiple new layouts that is executable to render the new UI design.

At 930, the computer system transmits, to the computing device, the N different versions of new content. In some embodiments, each of the N different versions of the new content are automatically generated using a different one of the N different style codes. In some embodiments, generating the N different versions of the new content includes automatically generating multiple new layouts for a new user interface (UI) design. In some embodiments, the computer system generates, based on one of the multiple new layouts for the new UI design and a set of colors for the new UI design, information specifying the new UI design. In some embodiments, the computer system causes, using the information specifying the new UI design, display of the new UI design.

FIG. 10 is a flow diagram illustrating a method 1000 for transforming a layout image to a text-based representation of the layout image, according to some embodiments. The method shown in FIG. 10 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, image conversion module 270 performs the elements of method 1000.

At 1010, in the illustrated embodiment, a server computer system receives a layout image that includes a plurality of portions representing a plurality of user interface (UI) elements included in a UI design. In some embodiments, the plurality of portions include rectangles that are shaded using different pixel colors. In some embodiments, the plurality of portions represent one or more UI components included in the UI design.

At 1020, the server computer system transforms, by executing a trained residual neural network (ResNet), the layout image to a text-based representation of the layout image that specifies coordinates of bounding regions of the plurality of UI elements included in the UI design, where the text-based representation is usable to generate program code executable to render the UI design. In some embodiments, the text-based representation usable to generate program code is generated in JavaScript Object Notation (JSON) format. In some embodiments, the layout image is a multi-channel layout image, where respective portions of the plurality of portions represent respective elements in the plurality of UI elements using different pixel colors.

In some embodiments, the server computer system performs one or more alterations to the coordinates of the bounding regions of the plurality of UI elements included in the UI design, wherein the one or more alterations include aligning a bounding box of a first element with a bounding box of one or more second elements included in the UI design. For example, if the bounding regions output by the trained ResNet are not center, the server computer system may perform operations to snap the bounding regions to absolute coordinates.

In some embodiments, the server computer system trains the ResNet to identify center points, widths, and height of a plurality of portions included in layout images representing UI elements included in a plurality of existing UI designs. For example, the ResNet may be trained to identify the dimensions and locations of each pixel included in the pixelated layout image output by a layout GAN model.

In some embodiments, training the ResNet includes generating noise for respective ones the layout images and inputting, to the ResNet, the layout images and the noise for respective ones of the layout images. In some embodiments, the layout image is received from a generative adversarial network (GAN). In some embodiments, the noise is generated based on determining, for a plurality of layout images output by the GAN, an amount that edges of a plurality of portions included in the plurality of layout images differs from edges of bounding regions of a plurality of elements represented by the plurality of portions, where the plurality of elements are included in a plurality of existing UI designs corresponding to the plurality of layout images.

In some embodiments, the server computer system receives, information specifying a current user interface (UI) having an existing layout and existing colors. In some embodiments, the server computer system generates, for the UI design using a first generative adversarial network (GAN), the layout image, where generating the layout image is performed by inputting the information specifying the current UI into the first GAN. In some embodiments, the server computer system determines, using a second, different GAN, a set of colors for the UI design, where determining the set of colors is performed by inputting the layout image into the second GAN. In some embodiments, the server computer system generates, based on the set of colors and the text-based representation, the program code executable to render the UI design.

In some embodiments, the server computer system generates the layout image by inputting UI content for an existing UI design and a vector of multiple different style codes into a trained generative adversarial network (GAN) model and selecting a layout image from different versions of UI content for a new UI design output by the trained GAN model. In some embodiments, the server computer system generates, using the text-based representation, program code executable to render the UI design and transmits the program code to the user computing device.

Example Computing Device

Figure 11:
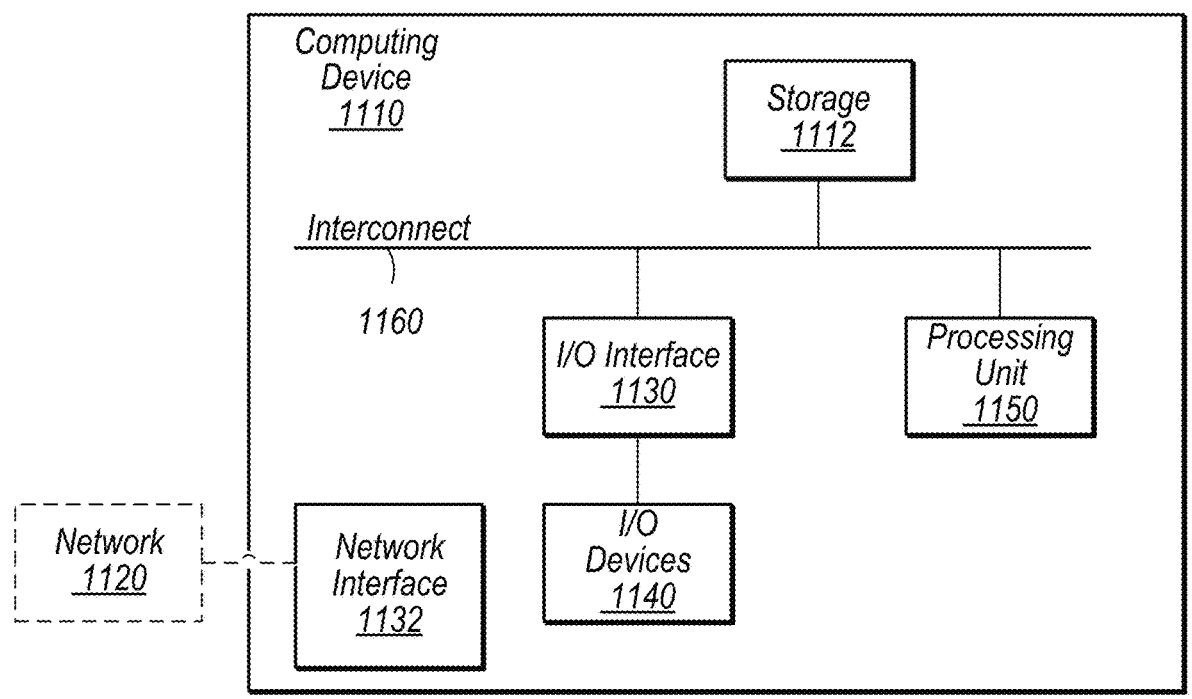
FIG. 11 is a block diagram illustrating an example computing device, according to some embodiments.

Turning now to FIG. 11, a block diagram of one embodiment of computing device (which may also be referred to as a computing system) 1110 is depicted. Computing device 1110 may be used to implement various portions of this disclosure. Computing device 1110 may be any suitable type of device, including, but not limited to, a personal computer system, desktop computer, laptop or notebook computer, mainframe computer system, web server, workstation, or network computer. As shown, computing device 1110 includes processing unit 1150, storage 1112, and input/output (I/O) interface 1130 coupled via an interconnect 1160 (e.g., a system bus). I/O interface 1130 may be coupled to one or more I/O devices 1140. Computing device 1110 further includes network interface 1132, which may be coupled to network 1120 for communications with, for example, other computing devices.

In various embodiments, processing unit 1150 includes one or more processors. In some embodiments, processing unit 1150 includes one or more coprocessor units. In some embodiments, multiple instances of processing unit 1150 may be coupled to interconnect 1160. Processing unit 1150 (or each processor within 1150) may contain a cache or other form of on-board memory. In some embodiments, processing unit 1150 may be implemented as a general-purpose processing unit, and in other embodiments it may be implemented as a special purpose processing unit (e.g., an ASIC). In general, computing device 1110 is not limited to any particular type of processing unit or processor subsystem.

Storage subsystem 1112 is usable by processing unit 1150 (e.g., to store instructions executable by and data used by processing unit 1150). Storage subsystem 1112 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on.

Storage subsystem 1112 may consist solely of volatile memory, in one embodiment. Storage subsystem 1112 may store program instructions executable by computing device 1110 using processing unit 1150, including program instructions executable to cause computing device 1110 to implement the various techniques disclosed herein.

I/O interface 1130 may represent one or more interfaces and may be any of various types of interfaces configured to couple to and communicate with other devices, according to various embodiments. In one embodiment, I/O interface 1130 is a bridge chip from a front-side to one or more back-side buses. I/O interface 1130 may be coupled to one or more I/O devices 1140 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

What is claimed is:

1. A method, comprising:
    generating, by a generative adversarial network (GAN) executed by a server computer system, a layout image, wherein the layout image is generated by inputting, into the GAN, a rendered existing user interface (UI) design and a separate background image that includes a picture upon which one or more UI elements to be included in a new UI design will be overlayed, wherein the layout image includes a plurality of portions representing a plurality of UI elements included in the new UI design, wherein the new UI design is generated for the same platform as the existing UI design, and wherein respective ones of the plurality of portions included in the layout image are pixels that include multiple properties representing attributes of respective ones of the UI elements;
    transforming, by a trained residual neural network (ResNet) executed by the server computer system, the layout image to a text-based representation of the layout image that specifies coordinates of bounding regions of the plurality of UI elements included in the new UI design; and
    generating, by the server computer system based on the text-based representation, program code executable to render the new UI design.

2. The method of claim 1, wherein the text-based representation is generated in JavaScript Object Notation (JSON) format.

3. The method of claim 1, wherein the layout image is a multi-channel layout image, and wherein respective portions of the plurality of portions represent respective elements in the plurality of UI elements using different pixel colors.

4. The method of claim 1, further comprising:
    training, by the server computer system, the ResNet to identify center points, widths, and heights of a plurality of portions included in layout images representing UI elements included in a plurality of existing UI designs.

5. The method of claim 4, wherein the training includes:
    generating noise for respective ones of the layout images; and
    inputting, to the ResNet, the layout images and the noise for respective ones of the layout images.

6. The method of claim 5, wherein the noise is generated based on:
    determining, for a plurality of layout images output by the GAN, an amount that edges of a plurality of portions included in the plurality of layout images differs from edges of bounding regions of a plurality of elements represented by the plurality of portions, wherein the plurality of elements are included in a plurality of existing UI designs corresponding to the plurality of layout images.

7. The method of claim 1, further comprising:
performing, by the server computer system, one or more alterations to the coordinates of the bounding regions of the plurality of UI elements included in the new UI design, wherein the one or more alterations include aligning a bounding region of a first element with a bounding region of one or more second elements included in the new UI design.

8. The method of claim 1, wherein the server computer system generates the layout image by:
inputting a vector of multiple different style codes into the GAN, wherein the multiple different style codes correspond to at least multiple different preferred orientations and locations for UI elements included in the layout image; and
selecting, for the new UI design, the layout image from different versions of UI content output by the GAN.

9. The method of claim 1, further comprising:
transmitting, by the server computer system to a user computing device, the program code.

10. A non-transitory computer-readable medium having instructions stored thereon that are executable by a computing device to perform operations comprising:
generating, by a generative adversarial network (GAN), a layout image that is generated by the GAN from a background image that includes a picture which one or more user interface (UI) elements to be included in a new UI design will be rendered over and a rendered version of a current UI design, wherein the layout image includes a plurality of portions representing a plurality of UI elements included in the new UI design, wherein the new UI design is generated for a platform of the current UI design, and wherein respective ones of the plurality of portions included in the layout image are pixels that include multiple properties representing attributes of respective ones of the UI elements;
transforming, by a residual neural network (ResNet), the layout image to a text-based representation of the layout image that specifies coordinates of bounding regions of the plurality of UI elements included in the new UI design; and
generating, based on the text-based representation, program code executable to render the new UI design.

11. The non-transitory computer-readable medium of claim 10, wherein the text-based representation is generated in JavaScript Object Notation (JSON) format.

12. The non-transitory computer-readable medium of claim 10, wherein at least one of the plurality of portions in the layout image represents a copyspace of the new UI design.

13. The non-transitory computer-readable medium of claim 10, further comprising instructions stored thereon that are executable by the computing device to perform operations comprising:
training the ResNet to identify center points, widths, and heights of a plurality of portions included in layout images representing a plurality of elements included in a plurality of existing UI designs.

14. The non-transitory computer-readable medium of claim 13, wherein the training includes:
generating noise for respective ones of the layout images; and
inputting, to the ResNet, the layout images and the noise for respective ones of the layout images.

15. The non-transitory computer-readable medium of claim 10, wherein the operations further comprise:
receiving information specifying the current UI design having an existing layout and existing colors;
generating, for the new UI design using the GAN, the layout image, wherein generating the layout image is performed by inputting the information specifying the current UI design into the GAN;
determining, using a color GAN, a set of colors for the new UI design, wherein determining the set of colors is performed by inputting the layout image into the color GAN; and
generating, based on the set of colors and the text-based representation, the program code executable to render the new UI design.

16. A system, comprising:
at least one processor; and
a memory having instructions stored thereon that are executable by the at least one processor to cause the system to:
generate, by a generative adversarial network (GAN) executed by the system, a layout image, wherein the layout image is generated by inputting, into the GAN, a rendered existing user interface (UI) design and a separate background image that includes a picture upon which one or more UI elements to be included in a new UI design will be overlayed, wherein the layout image includes a plurality of portions representing a plurality of UI elements included in the new UI design, wherein the existing UI design and the new UI design are generated for a same given platform, wherein the layout image is a pixelated image, and wherein respective ones of the plurality of portions are pixels that include multiple properties representing attributes of respective ones of the UI elements;
transforming, by a trained residual neural network (ResNet) executed by the system, the layout image to a text-based representation of the layout image that specifies coordinates of bounding regions of the plurality of UI elements included in the new UI design; and
generating, based on the text-based representation, program code executable to render the new UI design.

17. The system of claim 16, wherein the text-based representation is generated in JavaScript Object Notation (JSON) format.

18. The system of claim 16, wherein the background image is represented via a multi-channel image matrix, wherein each pixel in the multi-channel image matrix is represented by a binarized encoded bit.

19. The system of claim 16, wherein the instructions are further executable to cause the system to:
train the ResNet to identify center points, widths, and heights of a plurality of portions included in layout images representing a plurality of elements included in a plurality of existing UI designs.

20. The system of claim 16, wherein the instructions are further executable to cause the system to:
perform one or more alterations to the coordinates of the bounding regions of the plurality of UI elements included in the new UI design, wherein the one or more alterations include aligning a bounding region of a first element with a bounding region of one or more second elements included in the new UI design.

* * * * *